(12) United States Patent
Yuyama et al.

(10) Patent No.: US 7,873,435 B2
(45) Date of Patent: Jan. 18, 2011

(54) DISPENSING SUPPORT DEVICE AND DISPENSING SUPPORT METHOD

(75) Inventors: Hiroyuki Yuyama, Osaka (JP); Yasuhiro Shigeyama, Osaka (JP); Masahiko Kasuya, Osaka (JP); Shinya Yasuda, Osaka (JP)

(73) Assignee: Yuyama Mfg. Co., Ltd., Osaka (JP)

( * ) Notice: Subject to any disclaimer, the term of this patent is extended or adjusted under 35 U.S.C. 154(b) by 452 days.

(21) Appl. No.: 11/666,570

(22) PCT Filed: Oct. 27, 2005

(86) PCT No.: PCT/JP2005/019785

§ 371 (c)(1),
(2), (4) Date: Apr. 27, 2007

(87) PCT Pub. No.: WO2006/046642

PCT Pub. Date: May 4, 2006

(65) Prior Publication Data

US 2008/0149656 A1    Jun. 26, 2008

(30) Foreign Application Priority Data

Oct. 28, 2004    (JP) .............................. 2004-314275

(51) Int. Cl.
    *G06F 17/00* (2006.01)
(52) U.S. Cl. ....................... 700/237; 700/236; 700/240; 700/244
(58) Field of Classification Search ................. 700/237, 700/236, 240, 244
    See application file for complete search history.

(56) References Cited

U.S. PATENT DOCUMENTS

| 5,805,456 | A | * | 9/1998 | Higham et al. | 700/237 |
| 6,151,536 | A | * | 11/2000 | Arnold et al. | 700/237 |
| 6,996,455 | B2 | * | 2/2006 | Eggenberger et al. | 700/237 |
| 7,263,411 | B2 | * | 8/2007 | Shows et al. | 700/237 |
| 7,675,421 | B2 | * | 3/2010 | Higham | 700/237 |

FOREIGN PATENT DOCUMENTS

JP        02-255149    10/1990

(Continued)

*Primary Examiner*—Gene Crawford
*Assistant Examiner*—Timothy R Waggoner
(74) *Attorney, Agent, or Firm*—Patterson Thuente Christensen Pedersen, P.A.

(57) ABSTRACT

To permit a plurality of pharmacists to perform dispensing efficiently and simultaneously despite of simple, low-cost configuration.

There are provided: responsible a pharmacist identification means 7 which is provided at each container 14 of a drug rack 3 where a drug D is contained and which identifies a responsible pharmacist; a memory 25 where the pharmacist data is stored; and a control means 24 which, as a result of inputting the prescription data, associates the prescription data and the pharmacist data stored in a memory means 25 with each other to create a prescription table, stores the prescription table into the memory means 25, and then, when the drug is taken out from the drug rack 3, refers to the prescription table based on the pharmacist data of the pharmacist identified by the responsible pharmacist identification means 7, and judges whether or not the pharmacist is permitted to perform dispensing of the drug to be taken out from the drug rack 3.

24 Claims, 21 Drawing Sheets

FOREIGN PATENT DOCUMENTS

| | | |
|---|---|---|
| JP | 02-309967 | 12/1990 |
| JP | 08-107922 | 4/1996 |
| JP | 2002-17821 | 1/2002 |
| JP | 2002-282342 | 10/2002 |
| JP | 2003-144525 | 5/2003 |
| JP | 2004-187959 | 7/2004 |
| JP | 2006-004119 | 1/2006 |

* cited by examiner

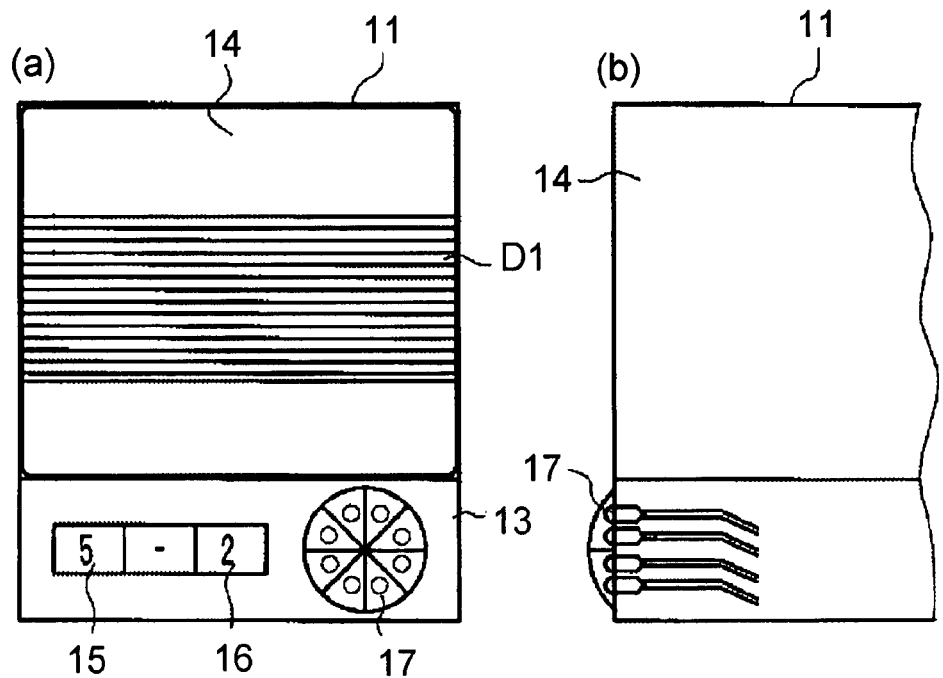
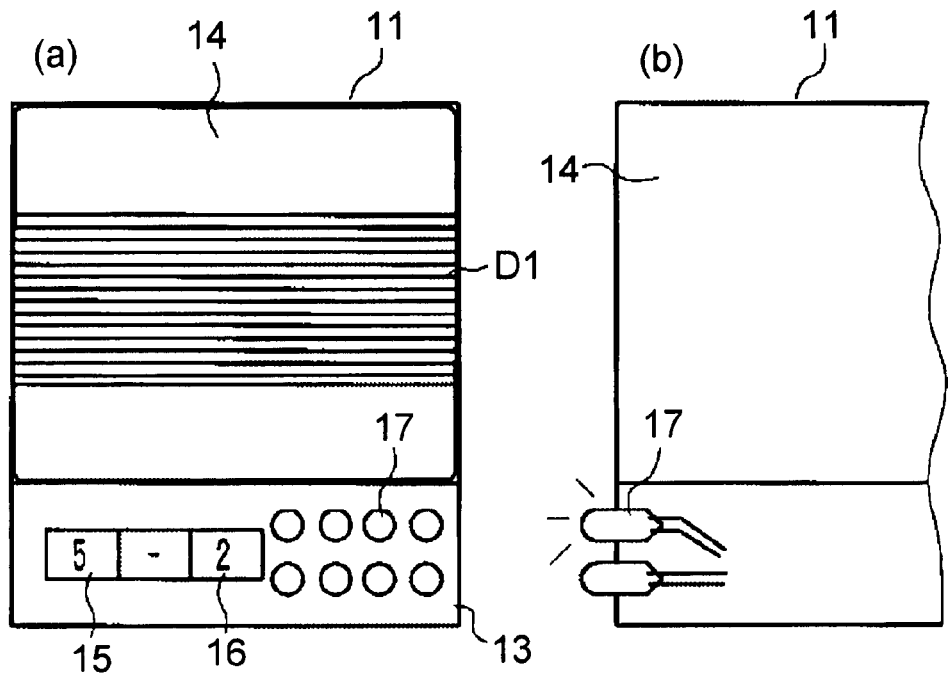

Figure 9

Drug master table

| Drug ID | Drug name | Packaging method |
|---|---|---|
| ⋮ | ⋮ | ⋮ |
| 2000 | Maglax tablets 330 mg | Heat |
| 2001 | Sennaride tablets 12 mg | |
| 2002 | Juvera nicotinate 100 mg | |
| ⋮ | ⋮ | ⋮ |

| Standard amount | Effect | Form | · · |
|---|---|---|---|
| ⋮ | ⋮ | ⋮ | ⋮ |
| | | Tablets | |
| | | Tablets | |
| | | Capsules | |
| ⋮ | ⋮ | ⋮ | ⋮ |

Figure 10

Drug management master table

| Storage management ID | Rack position | Drug ID |
|---|---|---|
| ⋮ | ⋮ | ⋮ |
| A12000 | A1 | 2000 |
| A22001 | A2 | 2001 |
| B12002 | B1 | 2002 |
| ⋮ | ⋮ | ⋮ |

Figure 11

In-service pharmacist master table

| In-service pharmacist ID | Identification (ring) ID | Pharmacist ID |
|---|---|---|
| ⋮ | ⋮ | ⋮ |
| 1001A | 1001 | A |
| 1002B | 1002 | B |
| 1003C | 1003 | C |
| ⋮ | ⋮ | ⋮ |

| Login | Logout |
|---|---|
| ⋮ | ⋮ |
| 2004/9/30 1:05 PM | 2004/10/1 4:05 PM |
| 2004/9/30 1:00 PM | 2004/10/1 3:05 PM |
|  |  |
| ⋮ | ⋮ |

Figure 12

Prescription table

| Patient ID | Patient name | Prescription ID | Drug ID |
|---|---|---|---|
| P001 | Yuyama Hanako | S100001 | 2000 |
|  |  |  | 2001 |
|  |  |  | 2002 |

| Dosage period | Number of days | Date | In-service pharmacist ID |
|---|---|---|---|
| Morning, Noon, Evening | 3 | 2004/9/1 | 1001A |
| Morning, Evening | 7 | 2004/9/1 | 1002B |
| Every meal | 14 | 2004/9/1 | 1003C |

| Patient ID | Prescription ID | Drug ID | Drug ID completion time |
|---|---|---|---|
| P001 | S100001 | 2000 | 2004/9/30 1 : 30 PM |
| P002 | P100002 | 2003 | 2004/9/30 2 : 00 PM |
| | | | |

| Drug ID | Drug ID completion time |
|---|---|
| 2001 | 2004/10/1 12 : 05 PM |
| | |
| | |

Figure 17
(a)
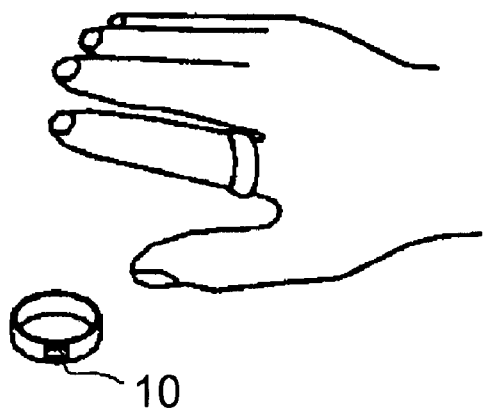
(b)
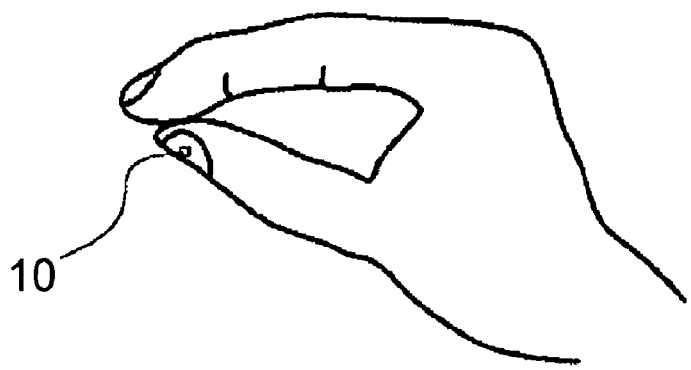
(c)
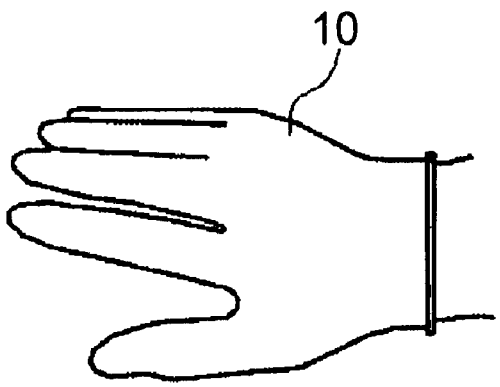

Figure 20
(a)
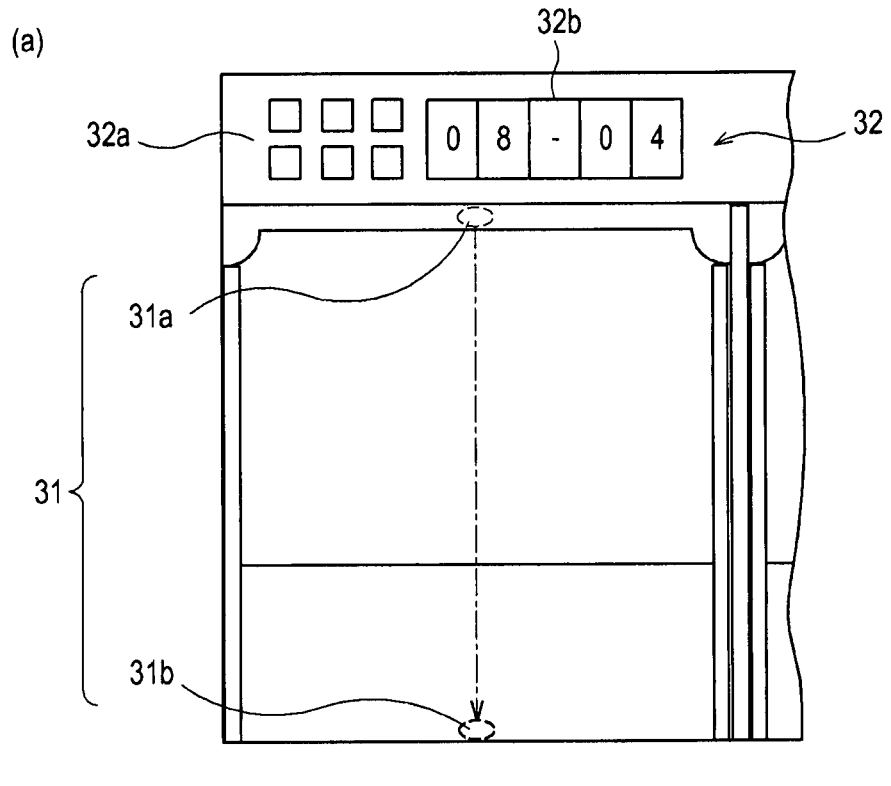
(b)
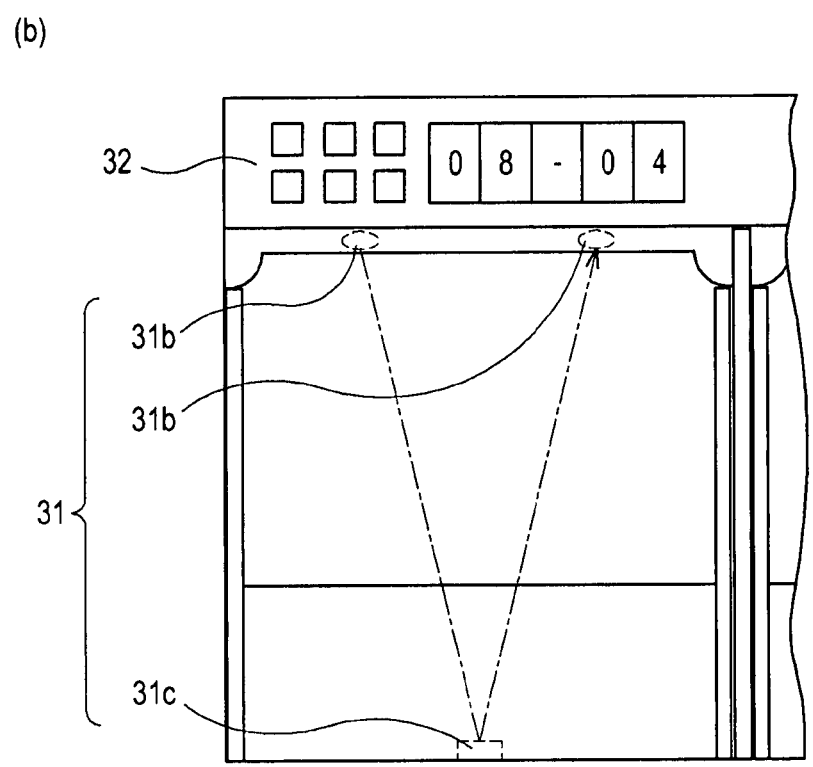

Figure 22
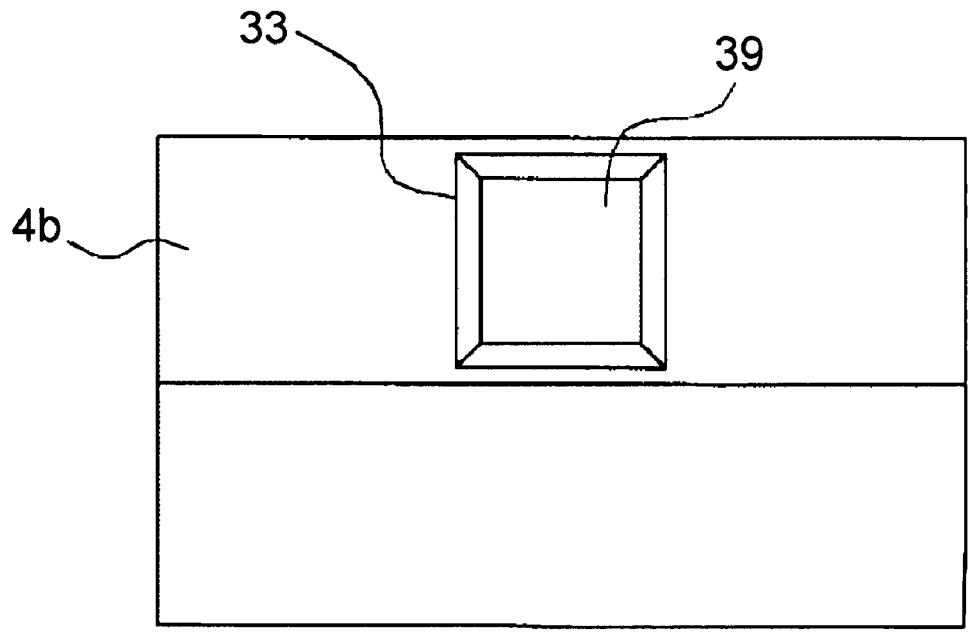
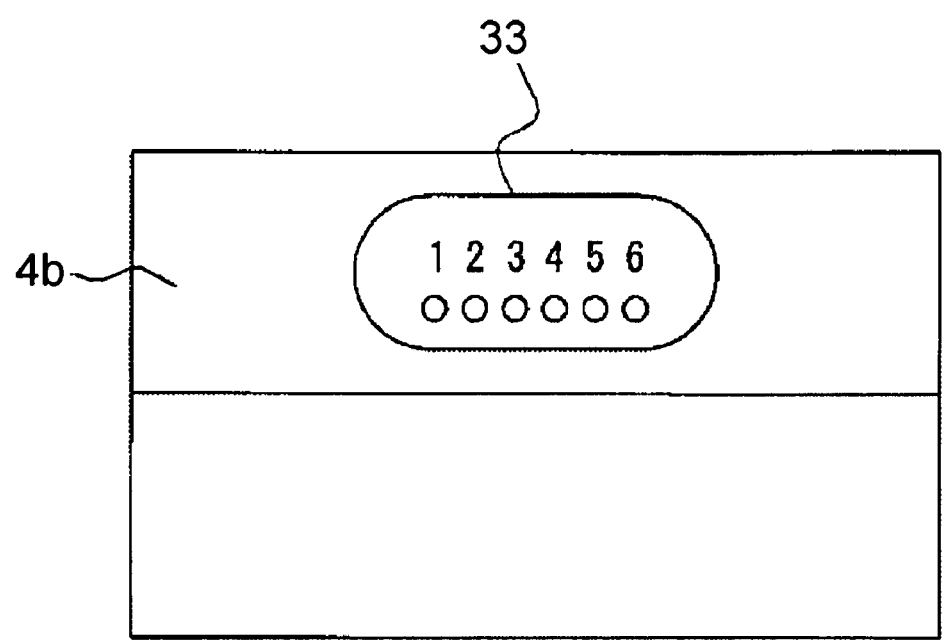

DISPENSING SUPPORT DEVICE AND DISPENSING SUPPORT METHOD

TECHNICAL FIELD OF THE INVENTION

The present invention relates to a dispensing support device and a dispensing support method.

BACKGROUND OF RELATED ARTS

Conventionally, in performing dispensing, a pharmacist takes a look at a prescription and then takes out a drug from a drug rack. However, with this method, human error, such as misunderstanding of the prescription or the like, is likely to occur. In addition, there is a large difference in the workability depending on a difference in the skill level among pharmacists.

Thus, to support dispensing, a manual device (for example, see patent document 1) or an automatic device (for example, see patent documents 2 through 4) have been proposed.

In addition, a drug management system has been proposed in which an IC chip is provided to a wrist band fitted on a person responsible for dispensing so that, when information of the responsible person stored on the IC chip is read by an antenna provided in a container where a drug is contained, this information together with time at which this information has been read is memorized into a memory part provided in the container (for example, see patent document 5).

Patent document 1: Japanese Unexamined Patent Publication No. 2004-187959
Patent document 2: Japanese Patent No. 2826547
Patent publication 3: Japanese Patent No. 2818759
Patent publication 4: Japanese Patent No. 3083165
Patent publication 5: Japanese Unexamined Patent Publication No. 2003-144525

SUMMARY OF THE INVENTION

Problem to Be Solved by the Invention

However, a manual type is only adapted so that the door of a corresponding rack or the like is automatically opened when a direction note is read by a bar code reader. Thus, a plurality of direction notes cannot be read at a time to permit a plurality of pharmacists to perform dispensing simultaneously. Moreover, it is impossible to take any action even when a drug has been taken out from a wrong rack.

With an automatic type, the device is upsized and complicated, and thus high-priced.

A drug management system is only capable of providing record of dispensing operation, failing to provide an environment that permits a plurality of persons to perform the operation simultaneously.

Accordingly, it is an object of the present invention to provide a dispensing support device and a dispensing support method with favorable workability that permits a plurality of pharmacists to perform dispensing simultaneously despite of its simple and low-cost configuration.

Means for Solving the Problems

The present invention refers to, as means for solving the problem, the dispensing support device including: a responsible pharmacist identification means which is provided at each container of a drug rack where the drugs are contained and which identifies a responsible pharmacist; a memory means where pharmacist data is stored; and a control means which, as a result of inputting prescription data, associates the prescription data and the pharmacist data stored in the memory means with each other to create a prescription table, stores the prescription table into the memory means, and then, when the drug is to be taken out from the drug rack, refers to the prescription table based on the pharmacist data of the pharmacist identified by the responsible pharmacist identification means, and judges whether or not the pharmacist is permitted to perform dispensing of the drug to be taken out from the drug rack.

The responsible pharmacist here means the pharmacists identified by the responsible pharmacist identification means from among pharmacists registered in the pharmacist data. The prescription data means data concerning contents of a prescription created by the doctor. The pharmacist data means data concerning a pharmacist, for example, a name, a code number, and the like.

With the configuration described above, when the drug is to be taken out from the container, the pharmacist is identified by the responsible pharmacist identification means provided at each container, and it is judged by referring to the prescription table whether or not the pharmacist is authorized to take out the drug from this container. This therefore permits appropriately preventing taking out the drug from a wrong container even when a plurality of pharmacists simultaneously perform dispensing operation. In addition, it is only required to provide the responsible pharmacist identification means at each container and to judge whether or not the pharmacist who attempts to take out the drugs from this container has received a permit, thereby permitting the manufacture at low cost with simple configuration.

It is preferable that a subject to be identified by the responsible pharmacist identification means be an identifying member fitted on a hand of the pharmacist.

With this configuration, when the pharmacist inserts his or her hand in the container to take out the drug from the drug rack, the identifying member can be reliably read by the responsible pharmacist identification means provided at each container. Therefore, it can be appropriately judged whether or not the pharmacist is authorized to take out the drug from this container.

It is preferable that there be further provided: further including a pharmacist data reading means for reading the pharmacist data at start of dispensing, and an in-service pharmacist identification means for identifying an in-service pharmacist at the start of dispensing, and that the control means judge whether or not the pharmacist data read by the pharmacist data reading means is memorized in the memory means, and, if it is judged that the pharmacist data is memorized, create an in-service pharmacist table by associating the pharmacist data and data on the in-service pharmacist identified by the in-service pharmacist identification means with each other, and then store the in-service pharmacist table into the memory means.

With this configuration, at the start of dispensing, it is judged whether or not the pharmacist data read by the pharmacist data reading means is memorized in the storage means, and it can be judged by the in-service pharmacist identification means whether or not this pharmacist is permitted to perform dispensing. Thus, a registered pharmacist is permitted to perform dispensing, and thus only a person who has received a permit can perform dispensing.

It is preferable that each rack of the drug rack be provided with a display part which can be identified on an individual responsible pharmacist basis.

With this configuration, even when a plurality of pharmacists perform simultaneously dispensing, each pharmacist can recognize at first sight from which container he or she should take out the drug, thereby permitting the dispensing operation to proceed very efficiently.

It is preferable that each rack of the drug rack be provided with a drug remaining amount detection part for detecting a drug remaining amount.

With this configuration, when the drug is taken out from the container in accordance with the prescription data, the drug remaining amount and the amount of the drug taken out based on this drug remaining amount can be detected. This permits performing inventory management and also permits checking whether or not the amount of the drug taken out is correct.

It is preferable that the control means set association between the prescription data and the responsible pharmacist for each drug and store the association into the memory means.

With this configuration, detailed and efficient dispensing operation can be performed. For example, a responsible pharmacist can be determined for each drug, and a plurality of pharmacists can be located in line to carry out dispensing as in assembly-line operation.

It is preferable that, as a result of detection by the drug remaining amount detection part that the drug has been taken out from the drug rack, the control means calculate the drug taken out and amount thereof and contain the drug and the amount into a dispensing completion table each time when the dispensing has been completed.

With this configuration, it can be identified who is the pharmacist that has performed dispensing and which drug has been taken out from the drug rack in what amount, and the like. In addition, it can be clarified where responsibility lies.

It is preferable that, an open and close member be further provided which is capable of driving the drug rack to open and close, and that the control means identify the pharmacist by the in-service pharmacist identification means, and, if there is any data corresponding to the pharmacist data previously stored in the memory means, control driving of the open and close member to open the drug rack.

It is preferable that a door capable of being driven to open and close be provided in each container of the drug rack, and that the control means reads a responsible pharmacist from the prescription table memorized in the memory means based on the inputted prescription data, and judges whether or not the read responsible pharmacist agrees with the pharmacist identified by the in-service pharmacist identification means, and, if there is agreement, open the door of the container where the drug included in the prescription data is contained.

With these configurations, a drug can be reliably prevented from being taken out from the drug rack by an unauthorized third party at times, such as at night. With the one having each container provided with the door in particular, the drug can be prevented from being taken out by an unauthorized person even in process of operation.

It is preferable that the aforementioned each container of the drug rack be further provided with approaching object detection means for detecting an object approaching the container, and that, when a detection signal is inputted from the drug take-out implementation detection means under absence of a detection signal inputted from the pharmacist identification means, the control means judge the input of the detection signal as an error.

With this configuration, an alarm can be provided, without fitting an identifying member, for an event in which the drug is taken out from the drug rack. Thus, erroneous take-out operation and wrong take-out operation can be appropriately prevented while maintaining an environment that permits the drug to be easily taken out from the drug rack, that is, a state in which the drug rack is kept open.

It is preferable that further a drawer be provided which is capable of storing the drug, an inside of which is divided into a plurality of container, and which includes: one display part which is arranged at a portion exposed to an outside before the drawer is drawn and which displays, based on the prescription data, whether or not the drug subjected to dispensing is contained; and another display part which is arranged at the exposed portion by drawing the drawer and which indicates the container where the drug subjected to the dispensing is contained.

With this configuration, a corresponding data can be quickly taken out from a drawer storing the drug which drawer cannot be confirmed directly with the eyes. That is, by checking in which drawer the corresponding drug is contained and then drawing out the drawer from the drug rack, it can be recognized at first sight in which container the corresponding drug is contained.

The present invention refers to, as means for solving the problem described above, a dispensing support method comprising: creating, as a result of inputting prescription data, associates the prescription data and the pharmacist data with each other to create the prescription table; when the drug is to be taken out from the drug rack, identifying the responsible pharmacist by the responsible pharmacist identification means provided at each container of the drug rack; referring to the prescription table based on the pharmacist data of the pharmacist identified by the responsible pharmacist identification means; and judging whether or not the pharmacist is permitted to perform the dispensing of the drug to be taken out from the drug rack.

Effects Of The Invention

The present invention is only configured such that the responsible pharmacist identification means is provided at each container of the drug rack to judge whether or not a person who attempts to take out the drugs is permitted to perform dispensing. Thus, this not only permits manufacture at low cost with simple configuration but also permits reliably preventing a drug from being wrongly taken out from a different container.

PREFERRED EMBODIMENTS OF THE INVENTION

Hereinafter, the embodiments according to the present invention will be described referring to the accompanying drawings.

First Embodiment

FIG. 1 shows the exterior of a dispensing support device 1 according to a first embodiment. This dispensing support device 1 is formed by placing a drug rack 3 on a dispensing base 2.

The dispensing base 2 includes a plurality of drawers 4 drawably provided in a front side thereof, and has health related members such as catheter, poultices, gauze, or the like, and drugs such as guttae or the like, which are contained inside thereof. In addition, on the dispensing base 2, a bar code reader 5 shown in FIG. 2 is set. This bar code reader 5 includes a bar code identification part 6, a RFID antenna 7 (RFID: Radio Frequency Identification), a buzzer 8, and the like. The bar code identification part 6 identifies a bar code A printed on a dispensing direction note P (see FIG. 8), whereby prescription data for a patient written on a direction note P is extracted from among those inputted from a host computer 9 (data concerning contents of prescriptions created by a doctor). The RFID antenna 7 is one example of in-service pharmacist identification means according to the present invention, which is used for identification of an identifying member 10, such as a ring, fitted on the finger of an in-service pharmacist, as described later. In operation of reading the bar code A on the direction note P by the bar code identification part 6, the in-service pharmacist can unintentionally have the identifying member 10 automatically identified. The buzzer 8 is provided for the purpose of providing, upon dispensing in accordance with the contents of the dispensing direction note P, a notification to the in-service pharmacist in occasions, such as when a wrong drug D has been taken out, when the bar code A on the direction note P is read by the bar code reader 5, or the like. Notification methods include notification with a confirmation sound such as "Peep" or the like, and notification with a sound such as "Wrong drug" or the like.

The drug rack 3 includes a plurality of cassettes 11 as a container, and drugs D (D1, D2) are contained in their respective cassettes 11 by type. The front of the drug rack 3 can be closed by a shutter 12 provided at the top, thus completely blocking take-out of the drugs D from the cassettes 11 when not in use, for example, at night or the like.

Each cassette 11 has on the front thereof a display operation panel 13 as shown in FIG. 3, above which a drug container 14 is formed with an opening provided in the front thereof. As shown in FIG. 3C, provided on the display operation panel 13 are: an expected amount display part 15, a taken-drug amount display part 16, an identification display part 17, and a cancel button 18. The expected amount part 15 displays the amount of the drug D determined, based on prescription data, to be taken out from the cassette 11. The taken-drug amount display part 16 displays the amount of the drug D actually taken out from the cassette 11. The cancel button 18 is used, for example, to stop the dispensing.

The display operation panel 13 may display, as shown in FIG. 3D, the amount of the drug D contained ("5" in FIG. 3D) and a fractional drug ("2" in FIG. 3D). The drug D here means a drug intact in form as delivered from a drug company or the like. For example, in the case of a Press Through Pack, a sheet of serial several tablets or the like, each separately packed, corresponds to the drug D. The fractional drug means the state in which a portion of the drug D is separated therefrom.

The identification display part 17 may be, as shown in FIG. 4 or 5, composed of light emitting diodes (LEDs) of a plurality of different colors. In FIG. 4, the LEDs are arranged on the circumference. In FIG. 5, the LEDs are arranged in two (upper and lower) rows. The amount, color, and the like of the LED and also the arrangement position thereof may be freely selected. In any case, the responsible in-service pharmacists (responsible pharmacists) can be identified based on different illuminating colors. This permits the responsible pharmacist to recognize, at first sight, that the drug D to be prepared is contained in the cassette 11 with the LED illuminating in the assigned color. Alternatively, instead of providing the LEDs of different colors for different responsible pharmacists, a display part or the like may be provided which displays a previously determined pharmacist ID or the like. That is, anything is permitted as long as it permits identifying who takes out a drug from a respective drug container 14 of the drug rack 3.

At the opening edge part of the drug container 14, an antenna wire 19 is provided which can be identified only when the identifying member 10 is inserted into the drug container 14. This antenna wire 19 is one example of the responsible pharmacist identification means of the present invention, and detects the identifying member 10 of a ring fitted on the finger of the responsible pharmacist, as shown in FIG. 17A. In this case, a wireless chip (RFID tag) is used for the identifying member 10. Note that the one identifiable without being touched, such as a bar code seal (bar code printed on the seal) or the like, the one identifiable by being touched through fingerprint authentication, touch communication system (see http://www.mew.co.jp/press/0409/0409-3.htm) or the like may be used. The wireless chip can be provided to a ring, a bracelet (see FIG. 17C), or the like for use. The bar code seal may be attached to a nail or the like as shown in FIG. 17B. Moreover, instead of the antenna wire 19, a color sensor together with use of colored gloves may be satisfactory. Needless to say, the identifying member 10 may be detected by the antenna wire 19, although not limited thereto, and thus it may be detected by an appropriate one in accordance with the type of the identifying member 10. Matching the color of the ring, colored gloves, or the like with the color of the LED to be lit permits easy judgment during the operation.

The identifying member 10 described above is used for the identification of the responsible pharmacist, and it may also be prepared for emergency take-out operation which permit the drugs to be taken out from any of the drug containers 14. However, this requires, as described below, identification of a pharmacist and recording which drug has been taken out in what amount. As an alternative for emergency take-out operation, an operation part, such as a switch or the like, may be separately provided so that the drug D can be taken out from any of the drug containers 14 by operating this operation part. Consequently, the operation can be performed quickly without replacing the ring or the like. Also in this case, the recording described above is required.

Inside the drug container 14, as shown in FIG. 3A, a tilt base 20 is installed at the bottom which protrudes toward the opening side in a gradually upward manner. On this tilt base 20, the drug D1 packaged with, for example, a press-through package or the like is so loaded in a stacked manner. The drug D1 stacked tilt along the tilt surface of the tilt base 20, in a manner such that the one located at the topmost part contacts the leading end of a bias arm 22 composing a drug remaining amount detection sensor 21. To the leading end of the bias arm 22, a roller 23 is so provided as to be freely rotatable so that the drug D1 can be taken out smoothly from the cassette 11. Then, a change in the amount of drugs stacked results in a change in the contacting position of the roller 23 provided to the leading end of the bias arm 22 and a change in the tilt angle of the bias arm 22, and this change in the tilt angle permits detection of the drug remaining amount. Between the tilt base 20 and the opening, a fractional drug container 14a is provided for placing the drug D2 as a fractional drug.

As the drug remaining amount detection sensor 21 described above, a reflection type sensor 27 shown in FIG. 6 or measuring instruments 28a and 28b shown in FIG. 7 can also be used. In FIG. 6, on the top surface of the cassette 11, the reflection type sensor 27 is provided, so that the amount of the drug D1 stacked on the tilt base 20 is estimated to calculate the drug remaining amount based on a period from when light emitted from a light emitting element is reflected on the drug D1 until when the light is received by a light receiving element. In FIG. 7, below the tilt base 20 and below the fractional drug container 14a, measuring instruments for detecting weight are provided which detect the drugs D1 and D2, respectively, to calculate the drug remaining amount based on the detected weight. However, those usable for the drug remaining amount detection sensor 21 described above is not limited to those described above.

The bar code reader 5, the cassette 11, and the like described above transmit and receive signals to and from a main controller 24 as shown in FIG. 8.

The main controller 24 performs various controls at the time of dispensing processing based on prescription data of each patient inputted from the host computer 9. The main controller 24 controls driving of the drug rack 3, a display 26, the buzzer 8 and the like by referring to tables stored in a memory part 25 based on a detection signal of a bar code reading part 6 or the RFID antenna 7 of the bar code reader 5, an antenna wire 19 of the cassette 11, or a drug remaining amount detection sensor 21.

The memory part 25 stores a patient master table, a drug master table, a drug management master table, an in-service pharmacist master table, an identification master table, a prescription table, a dispensing completion table, and the like.

The patient master table stores insurance card data (patient IDs (hereinafter all IDs mean Identification), patient names) and vital data such as blood types, heights, weights, allergy, and the like on an individual patient basis. The drug master table stores information of the drugs D, for example, drug IDs, drug names, packaging methods, specified quantities, effects, dosage forms, quantities of stock, filling dates, lot No., periods of validity (of the drugs D), and the like, as shown in FIG. 9. The drug management master table stores rack numbers of the drug rack 3 and the drugs D in association with each other, and storage management IDs, rack positions, and drug IDs, as shown in FIG. 10. However, the drug management master table is not required if the information associating the rack numbers and the drugs D with each other are added to the drug management master table. The in-service pharmacist master table stores, as shown in FIG. 11, information concerning pharmacists currently performing dispensing, including, for example, ring IDs, pharmacist IDs, login times, logout times, and the like. The identification master table stores, in association with the pharmacist IDs stored in the in-service pharmacist master table, ring IDs, colors (red, blue, yellow, green, light blue, purple, white ), failure alarm timer, blink patterns (blink quickly, blink slowly, no change, and or the like), completion alarm sounds, error alarm sounds, authorities, and the like. The prescription table stores prescription data in a standby state for dispensing, that is, patient IDs, patient names, prescription IDs, drug IDs, dosage periods, number of days, dates, in-service pharmacist IDs, and the like, as shown in FIG. 12. The dispensing completion table stores the dispensing completion data processed in the prescription table, that is, patient IDs, prescription IDs, drug IDs, completion times, and the like, as shown in FIG. 13.

Next, how the dispensing processing performed by the main controller 24 described above is controlled will be described following flowcharts shown in FIGS. 14 and 15 and referring to a data flow diagram shown in FIG. 16.

First, an authentication device, not shown, reads information concerning a pharmacist (pharmacist data) (step S1) and performs authentication (step S2: see FIG. 16A). The pharmacist data includes, for example, a password, an ID card, a fingerprint, a sound, an iris, and the like. The authentication is achieved by checking the read information with the pharmacist master table to judge whether or not the information is previously registered, that is, whether or not the pharmacist is permitted to perform dispensing processing. If the authentication has failed, the buzzer 8 or the like notifies an error (step S3), whereby the processing ends. This consequently prevents the drug D from being wrongly taken out. Note that, regardless of whether or not the shutter 12 is open, all pharmacists in attempt to perform dispensing need to be subjected to the authentication.

If the authentication has succeeded, it is judged whether or not the shutter 12 is open (step S4). If the shutter 12 is closed, it opens (step S5). If there is no authenticated pharmacist, the shutter 12 remains closed, thereby providing security that prevents an unauthorized third party from taking out the drug D.

Subsequently, it is judged whether or not the ring fitted on the pharmacist, that is, identification information stored in the identifying member 10 provided to the ring (in-service pharmacist data: for example, a ring identification ID) has been read by the RFID antenna 7 (step S6).

If the ring identification ID has been read, this ring identification ID and the pharmacist data read in step S1 described above are associated with each other, and are stored into the in-service pharmacist master table shown in FIG. 11 (step S7: see FIG. 16B). In addition, the display 26 provides a display notifying that the authentication has been completed (step S8).

Next, it is judged whether or not the bar code A provided on the direction note P (two-dimensional bar code obtained by coding prescription data) has been scanned by the bar code reader 5 (step S9). If the bar code A provided on the direction note P has been scanned, prescription data concerting the patient written thereon is read from the host computer 9, whereby a number of a rack storing the drug D to be prescribed and the like is read from the drug management master table (step S10).

If the prescription data and the like have been read, prescription data allocation processing starts (step S11). In the prescription data allocation processing, a prescription data ID of the prescription data read in step S10 described above and the ring identification ID stored in association into the in-service pharmacist master table in step S7 described above are associated with each other, and the pharmacist actually responsible for dispensing is determined as the responsible pharmacist and stored into the prescription table (see FIG. 16C).

If the responsible pharmacist has been determined, display processing is performed in which the LED of a respective cassette 11 (step S12) is illuminated. For the LEDs, a plurality of colors are prepared in correspondence with the identifying member 10 provided to the ring, so that the LED of a corresponding color illuminates. In the display processing, of the LEDs of the shelves that contain the drug D included in the prescription data, the LED corresponding to the responsible pharmacist illuminates, thereby permitting instant identification, at first sight, from which rack the drug D is to be taken out even when the dispensing is performed simultaneously by the plurality of responsible pharmacists.

When the dispensing performed by the responsible pharmacist starts, in the cassette 11 into which the hand has been put to take out the drug D, the antenna wire 19 reads the RFID tag (identifying member 10) provided to the ring fitted on the finger, upon which authentication is performed to see whether or not the drug D about to be taken out matches the drug D for which the pharmacist, who has put his or her hand, has been determined to take responsibility in step S9 (step S13). If the authentication has failed, the buzzer 8 or the like notifies an error (step S14), whereby the processing ends.

If the authentication has succeeded, it is judged whether or not the dispensing operation has ended (step S15). The end of the dispensing operation may be judged by detection that, in the cassette 11 where the operation of taking out the drug D has started, the next operation of taking out the drug D has not been performed for a certain period of time, or by detection that an operation completion button, not shown, has been operated by the responsible pharmacist who has judged that the dispensing has been completed.

If the dispensing operation has ended, it is judged whether or not this dispensing has been performed as prescribed (step S16). The judgment whether or not the dispensing has been performed as prescribed is achieved by judgment whether or not the amount of the drug D taken out from the cassette 11 meets the prescription data. If a larger amount of the drug D than is prescribed has been taken out, or if a smaller amount of the drug D than is prescribed has been taken out and a certain period of times has elapsed without the next operation of taking out the drug D, the buzzer 8 or the like notifies this to the responsible pharmacist (step S17). This consequently can reliably avoid an error in the amount of the drug D taken out. Moreover, the display 26 displays the contents of the error and also displays selection buttons including "Take out again" and "Ignore", and judges which button has been operated (step S18). If the "Take out again" button has been operated, the processing returns to step S13 to perform dispensing again. In this case, the drug D erroneously taken out may be returned to the original cassette 11. The "Ignore" button is operated in cases such as, for example, where the contents of the dispensing has changed due to an abrupt change in the condition of the patient but no data has been updated. In this case, history of take-out operation is recorded in step S19 to be described later, thus permitting investigating the cause of wrong operation or erroneous dispensing by clarifying where responsibility lies.

If the dispensing has been performed as prescribed and the "Ignore" button has been operated in step S18 described above, as shown in FIG. 13, history of take-out operation is recorded in the dispensing completion table shown in FIG. 13 (step S19: see FIG. 16D), and corresponding LEDs are sequentially turned off (step S20). At this point, it is judged whether or not, of the LEDs illuminated in step S12, there is any still illuminating (step S21). If there is any LED still illuminating, the processing proceeds to step S13 to repeat the dispensing described above, and the dispensing processing ends when the dispensing for all the drugs D included in the prescription data has been completed.

The operation of recording into the dispensing completion table performed in step S19 described above may be performed when the dispensing for certain prescription data has been all completed.

The dispensing operation is performed as described above. If the drug remaining amount detection sensor 21 detects that shortage or the like of the drug D has occurred in each cassette 11 of the drug rack 3, this is reported by the buzzer 8 or the like. The pharmacist contains a corresponding drug D into the cassette 11 where the shortage or the like has occurred. At this point, filling date is recorded into the drug master table, and the drug D filled and the rack number are associated with each other in the drug management master table, whereby the inventory management of the drugs D is appropriately performed.

Second Embodiment

FIGS. 18 and 19 show a dispensing support device 30 according to a second embodiment. This dispensing support device 30 differs from the one according to the first embodiment mainly in the following point. Hereinafter, in the description and figures below, those portions configured in the same manner are provided with the same numerals and thus omitted from the description.

In each cassette 11 of the drug rack 3, an approaching object detection sensor 31 is provided as shown in FIG. 20. In addition, in each cassette 11, a first display part 32 is provided as shown in FIG. 21. Further, also in each drawers 4, a second display part 33 is provided on the center of the holding part 4b provided on the front surface and a third display part 34 is provided on the top surface of a partition wall 4a inside the drawers 4, as shown in FIGS. 22 through 24.

Moreover, below the drug rack 3, a key hole 35 is provided which permits insertion of a shutter open-close key, not shown. The shutter 12 can be locked into a closed state by closing the drug rack 3 with the shutter 12 and inserting the shutter open-close key in the key hole 35 and turning it. Consequently, unlocking the shutter 12 to open the drug rack 3 can be controlled by authentication of both the key and the person who performs dispensing, thereby further providing excellent security.

On the top surface of a dispensing base 2, a dispensing completion button 36 is provided near the key hole 35. Pressing the dispensing completion button 36 when all dispensing operation has completed causes the shutter 12 to be automatically closed. Note that, when the person performing dispensing leaves the dispensing support device 30, pressing the dispensing completion button 36 permits the shutter 12 to be immediately closed, thereby making it possible to prevent the drug from being freely taken out.

The shutter 12 is so provided as to be freely movable along guide grooves 3a formed on the both side walls, as shown in FIG. 25. The shutter 12 is adapted to be reciprocally movable, by driving a motor, not shown, between the closed position where the front surface of the drug rack 3 is covered (see FIG. 25A) and the open position located at the rear side where the drug rack 3 opens (see FIG. 25B).

The insertion detection sensor 31 has a light-emitting element 31a and a light receiving element 31b respectively provided on the top center and bottom center of the opening edge part of each cassette 11, as shown in FIG. 20A. When taking out the drug from the inside of the cassette 11, a light path is always blocked by the hand put inside or the drug being taken out. That is, the light receiving element 31b cannot detect light emitted from the light-emitting element 31a, and thus the insertion detection sensor 31 outputs a detection signal (off signal in this case).

The insertion detection sensor 31 may be composed of the light-emitting element 31a and the light receiving element 31b respectively provided at upper left and upper right of the opening edge part of each cassette 11; and a reflection part 31c (for example, a reflective mirror) provided at the lower center thereof, as shown in FIG. 20B. With this composition, the light emitted from the light-emitting element 31a is detected by the light receiving element 31b after being reflected by the reflection part 31c, thus forming a light path of a substantially V shape. This therefore permits detection of the hand and a drug at low cost without increasing the amount of elements even when the opening area of the cassette 11 is large. Alternatively, the number of reflection parts 37 can be increased to form a light path in a zigzag manner. This requires only one light-emitting element 31a and one light receiving element 31b even for a cassette 1 having an even larger opening area of the entrance portion through which the hand is put in and out, which permits achieving low cost accordingly. To reflect light by the reflection part 31c, it is preferable that semiconductor laser light be used as a light source.

The first display part 32 is, as shown in FIG. 21A, formed of a display of liquid crystal or the like, and is composed of an ID display part 32a for displaying the identification number (ID) of an operator, and an amount display part 32b for displaying the amount of the drug contained in the cassette 11. The amount display part 32b is, as is the case with the first embodiment described above, capable of displaying the amount of the drug D contained (here, the number of sheets) and a fractional drug.

Alternatively, the first display part 32 may be configured to display the rack number only, as shown in FIG. 21B. When a plurality of persons responsible for dispensing perform operation simultaneously, the display color of the rack number or the background thereof may be changed. In this case, the display color may be changed in sequence starting for the person responsible for the dispensing for prescription data previously processed. For example, in a case where a red color is provided for a person A responsible for the dispensing for the first prescription data and a yellow color is provided for a person B responsible for the dispensing for the next prescription data, the display of the rack number may be first in red and then changed to yellow when a predetermined number of a corresponding drug has been taken out. If there is a next person responsible for dispensing, the color display corresponding to the first person responsible for dispensing may be identified by being blinked or otherwise. This permits judgment at first sight whether or not there is a next operator for the cassette 11 provided with this rack number. Thus, prioritizing a dispensing at this cassette 11 performed by the previous operator permits an improvement in the overall workability.

The first display part 32 may also be provided with an NG display part 37 and an OK display part 38 in addition to a rack number, as shown in FIG. 21C. The NG display part 37 is lit up for alarm when unauthorized person who performs dispensing wrongly inserts his or her hand inside the cassette 11. This may also be illuminated when a required amount of a drug to be prescribed does not remain inside the cassette 11. For the NG display part 37, a red LED can be used so as to draw attention from a person who performs dispensing and those surrounding him or her.

Further, the first display part 32 may be configured to provide responsible person identification display as shown in FIG. 21D. That is, a plurality of LEDs of different colors are provided in correspondence with a plurality of persons who perform dispensing, and a corresponding LED is illuminated when the person responsible dispensing is authenticated. Here, LEDs of six different colors are so used as to be aligned to permit six persons to perform dispensing operation simultaneously. As in step S1 described above, through authentication of a responsible pharmacist who performs operation, the corresponding LED may be illuminated. This permits a person who performs dispensing to more easily identify a target cassette 11 compared to the case described above where only the rack number is displayed, thus permitting a further improvement in the workability.

The second display part 33 is composed of an indication lamp 39 provided at the holding part 4b of each drawer 4 as shown in FIG. 22A. The indication lamp 39 is provided to permit recognizing at first sight, based on the prescription data during the dispensing, which drawer 4 contains a corresponding drug. The person who performs dispensing can identify the drawer 4 which contains a corresponding drug by viewing the illuminating indication lamp 39 without drawing the drawers 4 one by one, thereby permitting the dispensing operation to be performed efficiently. To permit simultaneous operation by a plurality of persons who perform dispensing, as is the case with the first display part 32 described above, configuration may be adopted which permits the display color of the indication lamp 39 to be changed, or responsible person identification display may be provided as shown in FIG. 22B.

The third display part 34 is configured in the same manner as the first display part 32 described above, and is provided on the top surface of the partition wall 4a provided inside the drawer 4. In FIG. 23, the third display parts 34 are provided, on the partition walls 4a located on both sides, in correspondence with the respective containers 4c (six sections here). In FIG. 24, the third display parts 34 are respectively provided on the top surface of the partition walls 4a partitioning in the drawing direction so that the third display parts 34 are located in front of the respective containers 4c (12 sections here) as viewed from the pharmacist.

As described above, the drawers 4 are provided with the second display part 33 and the third display part 34; therefore, the person who performs dispensing can identify, based on the second display part 33, which drawer 4 is concerned, and then can draw the identified drawer 4 to thereby identify at first sight which container 4c is concerned.

In the main controller 24, as is the case with the first embodiment described above, based on a detection signal at the antenna wire 19 provided at the opening part of the cassette 11, a person fitted with a RFID tag (the identifying member 10) judges whether or not the drug has been appropriately taken out, and based on a detection signal at the insertion detection sensor 31, the drug is prevented from being wrongly taken out. That is, when a drug is taken out from the cassette 11 while the RFID tag 10 is not fitted, a detection signal is inputted only from the insertion detection sensor 31 into the main controller 24. In this condition, the buzzer 8 rings or the display operation panel 13 provides alarm display to notify an error, thereby preventing the drug from being wrongly taken out.

The same effect described above can be provided by providing the insertion detection sensor 31 or the antenna wire 19 also in each container 4c of the drawer 4 described above to permit detection of the hand, the drug, or the identifying member 10.

Another Embodiment

In each of the embodiments described above, the configuration is adopted in which the entire drug rack 3 is opened and closed by the shutter 12. Alternatively, a door, not shown, may be provided which opens and closes the drug container 14 of each cassette 11.

That is, each door can be individually driven by the motor or the like to open and close. In addition, based on inputted prescription data, the responsible pharmacist is read from the prescription table stored in the memory part 25. Moreover, the RFID antenna 7 reads the identifying member 10 of the ring or the like fitted on the finger of the in-service pharmacist, and the pharmacist is identified according to the in-service pharmacist master table stored in the memory part 25. When the pharmacist has been identified, it is compared with the responsible pharmacist read from the prescription table described above. Then, it is judged whether or not both of them agree with each other. Each time when they agree, the door of the drug container 14 storing the drug included in the prescription data described above opens. Then, when a corresponding amount of the drug has been taken out, the door is automatically closed. For the door, a lock mechanism is adopted to thereby prevent the door at the closed state from being opened by the hand.

As described above, according to the present embodiments described above, a drug included in certain prescription data can be prepared by only a responsible pharmacist. Moreover, only a corresponding drug can be handled by opening and closing the door, which permits prevention of dispensing error and wrong take-out operation.

In each of the present embodiments described above, one responsible pharmacist is provided for one prescription data, but a responsible pharmacist may be determined for each drug. In this case, a plurality of responsible pharmacists may be provided for one prescription data.

With this method, a prescription table is previously prepared in which drugs (for example, drug codes) and pharmacists (for example, pharmacist codes) are respectively associated with each other. When prescription data is inputted, based on the drug included in this prescription data, the prescription table is referred to identify a responsible pharmacist of each drug.

For example, a drug rack is divided into a plurality of regions, and responsible pharmacists who perform dispensing of drugs contained in the respective regions are respectively determined. Then, if the prescription data is inputted, the pharmacists on standby at each region sequentially take out their corresponding drugs from the drug rack 3. More specifically, a pharmacist A, a pharmacist B, and a pharmacist C are prepared in the order mentioned for the first region, the second region, and the third region. When prescription data is inputted, display is provided to permit identifying which cassette 11 contains the drug included in this prescription data. The pharmacists take out the drugs while viewing this display. While transferring the tray in order from the first region to the second region and then to the third region, each of the pharmacists contains the taken out drug into the tray. This permits dispensing operation to be performed by assembly-line operation without being concerned with storage of a wrong drug in to the tray.

BRIEF DESCRIPTION OF THE DRAWINGS

FIG. 4A is an elevation view showing another example of the cassette, and FIG. 4B is a partial side view of this portion.

FIG. 5A is an elevation view showing another example of the cassette, and FIG. 5B is a partial side view of this portion.

FIG. 9 is a table showing contents of a drug master table.

FIG. 10 is a table showing the contents of a drug management master table.

FIG. 11 is a table showing the contents of an in-service pharmacist master table.

FIG. 12 is a table showing the contents of a prescription table.

FIG. 17 is a schematic diagram showing an example of an identifying member.

FIG. 20 is a schematic diagram showing an example of an insertion detection sensor adopted for the dispensing support device of FIG. 18.

FIG. 22 is an elevation view showing an example of a second display part adoptable for the dispensing support device of FIG. 18.

REFERENCE NUMERALS

Figure 1:
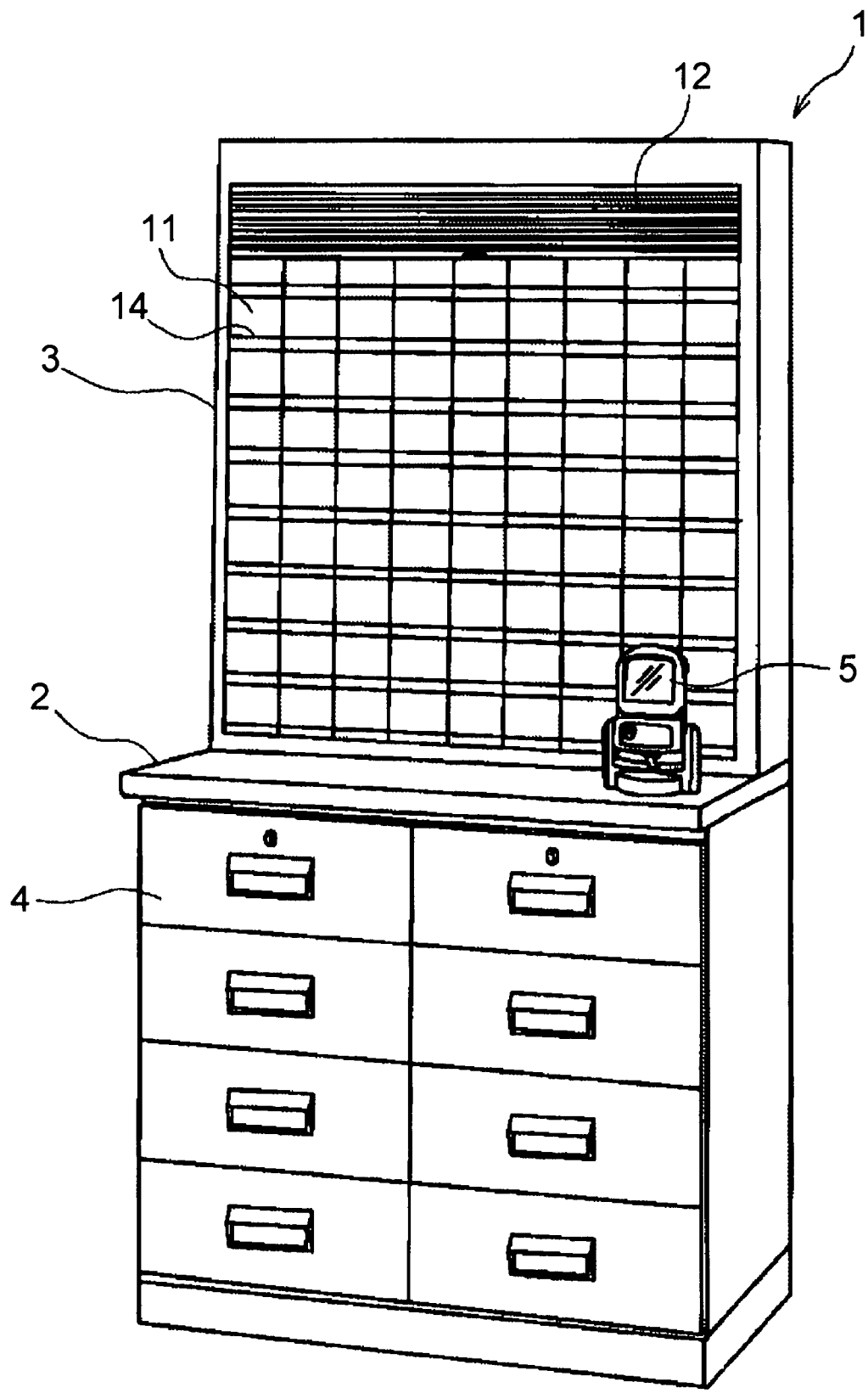
FIG. 1 is a perspective view showing an entire dispensing support device according to a first embodiment.
Figure 2:
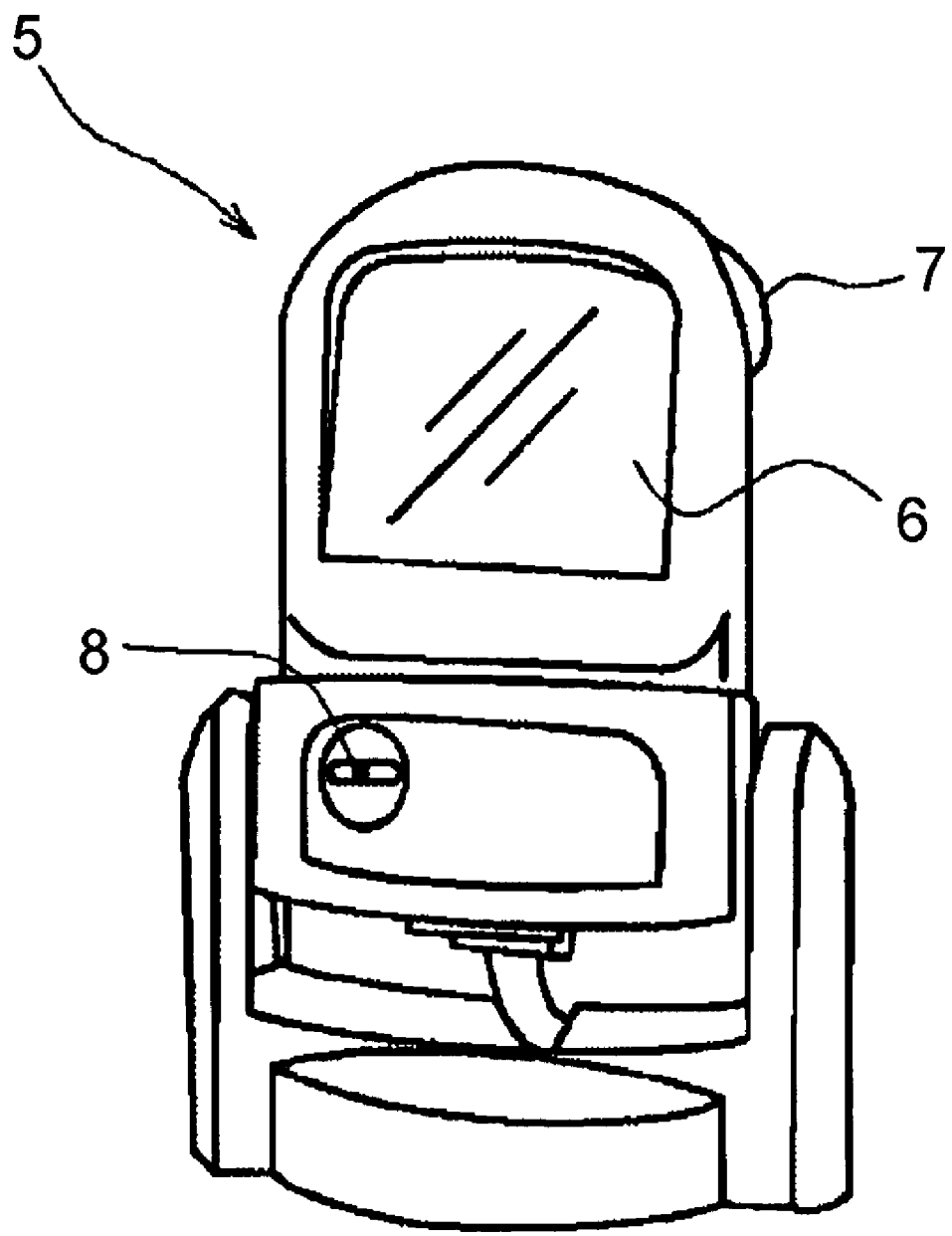
FIG. 2 is a perspective view showing a bar code reader of FIG. 1.
Figure 3:
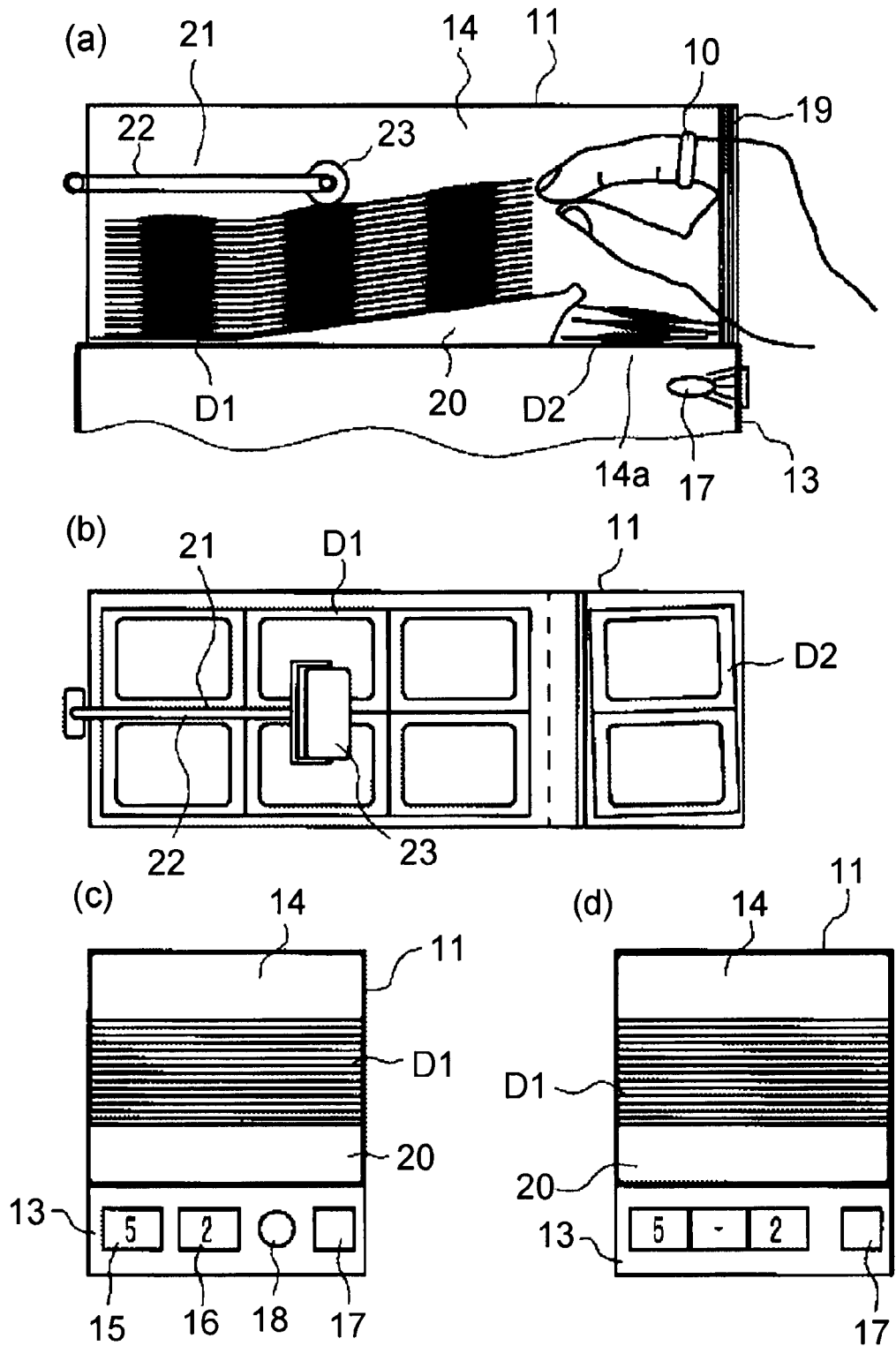
FIG. 3A is a side sectional view showing a cassette contained in a drug rack of FIG. 1.
FIG. 3B is a plan view thereof.
FIG. 3C is an elevation view thereof.
FIG. 3D is an elevation view showing another example.
Figure 6:
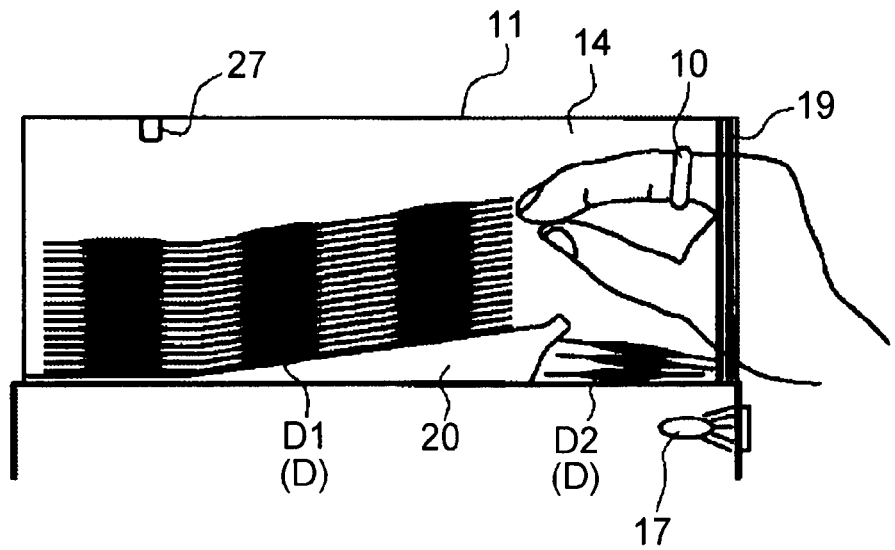
FIG. 6 is a side view showing another example of the cassette.
Figure 7:
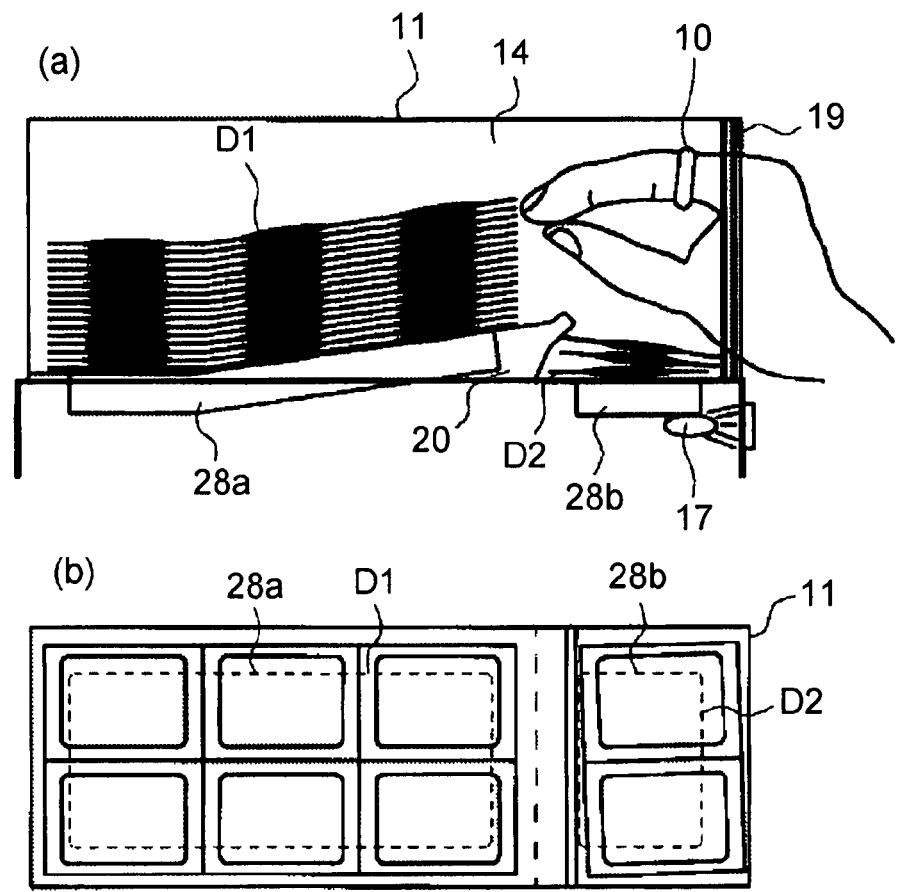
FIG. 7A is a side view showing another example of the cassette.
FIG. 7B is a plan view thereof.
Figure 8:
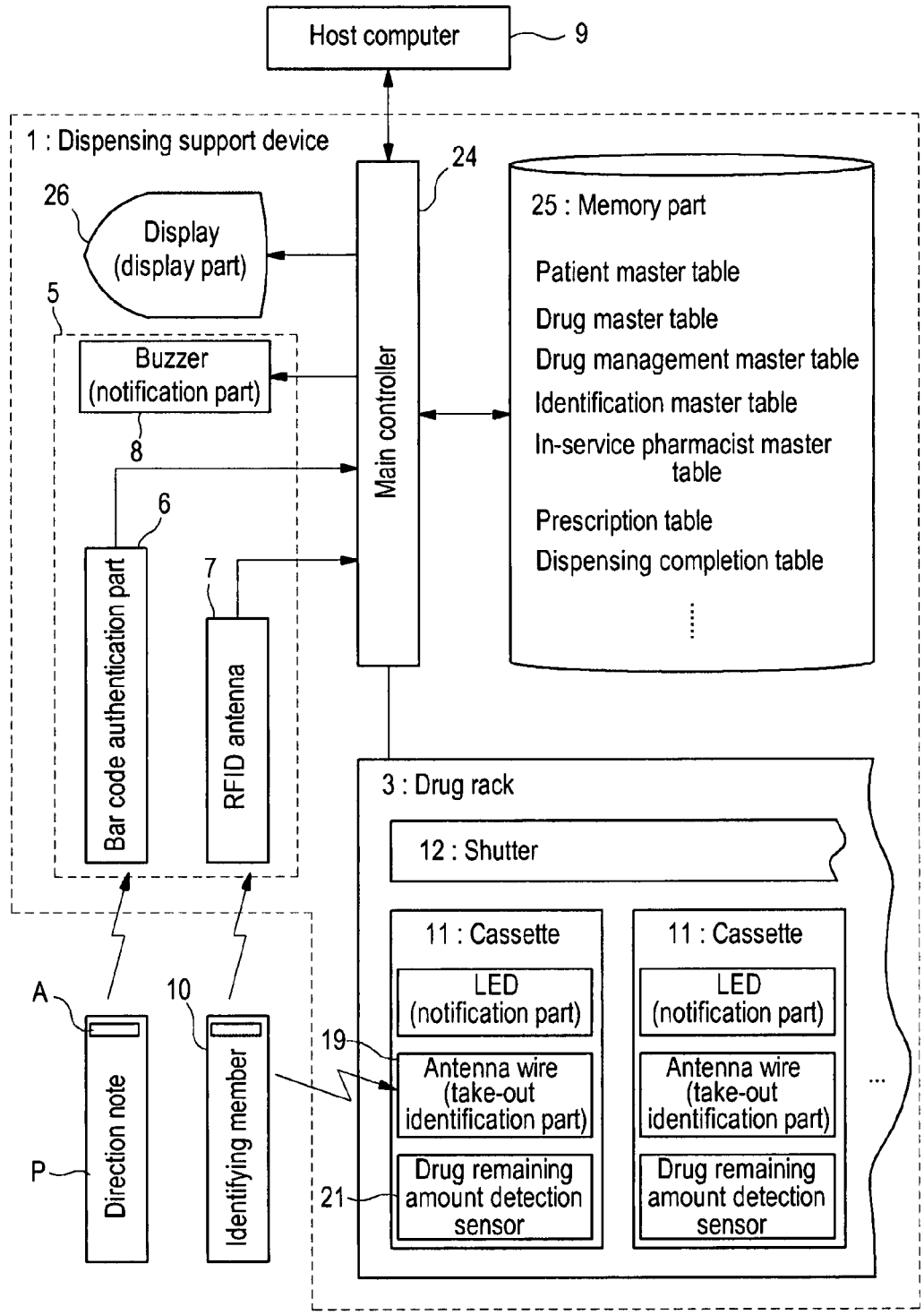
FIG. 8 is a block diagram schematically showing the outline configuration of the dispensing support device of FIG. 1.
Figure 13:
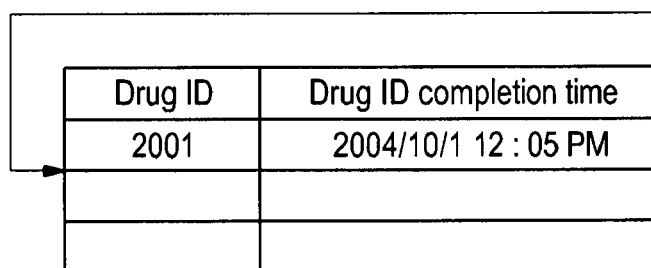
FIG. 13 is a table showing the contents of a dispensing completion table.
Figure 14:
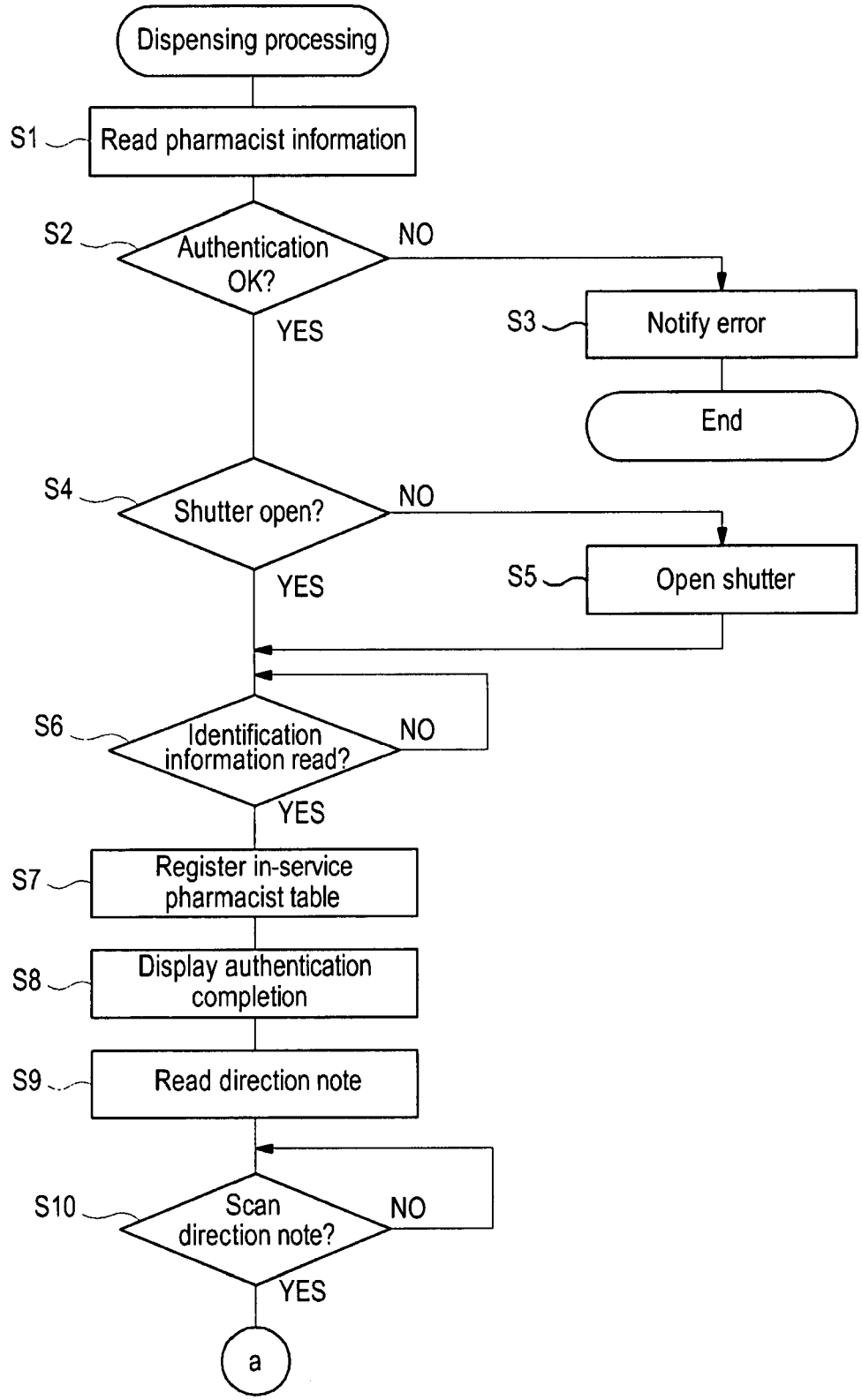
FIG. 14 is a chart diagram showing dispensing (picking) processing.
Figure 15:
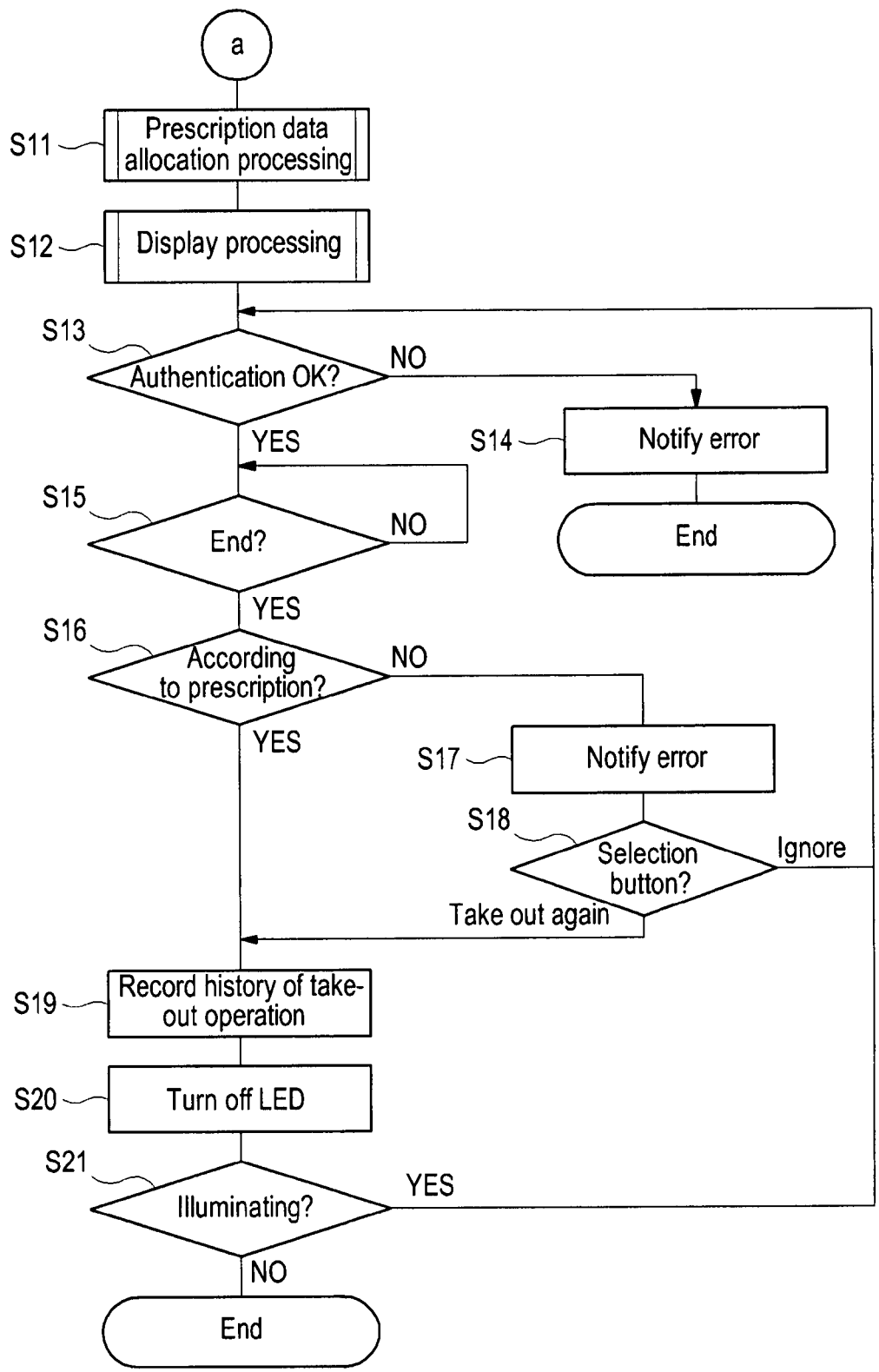
FIG. 15 is a flowchart diagram showing the dispensing (picking) processing.
Figure 16:
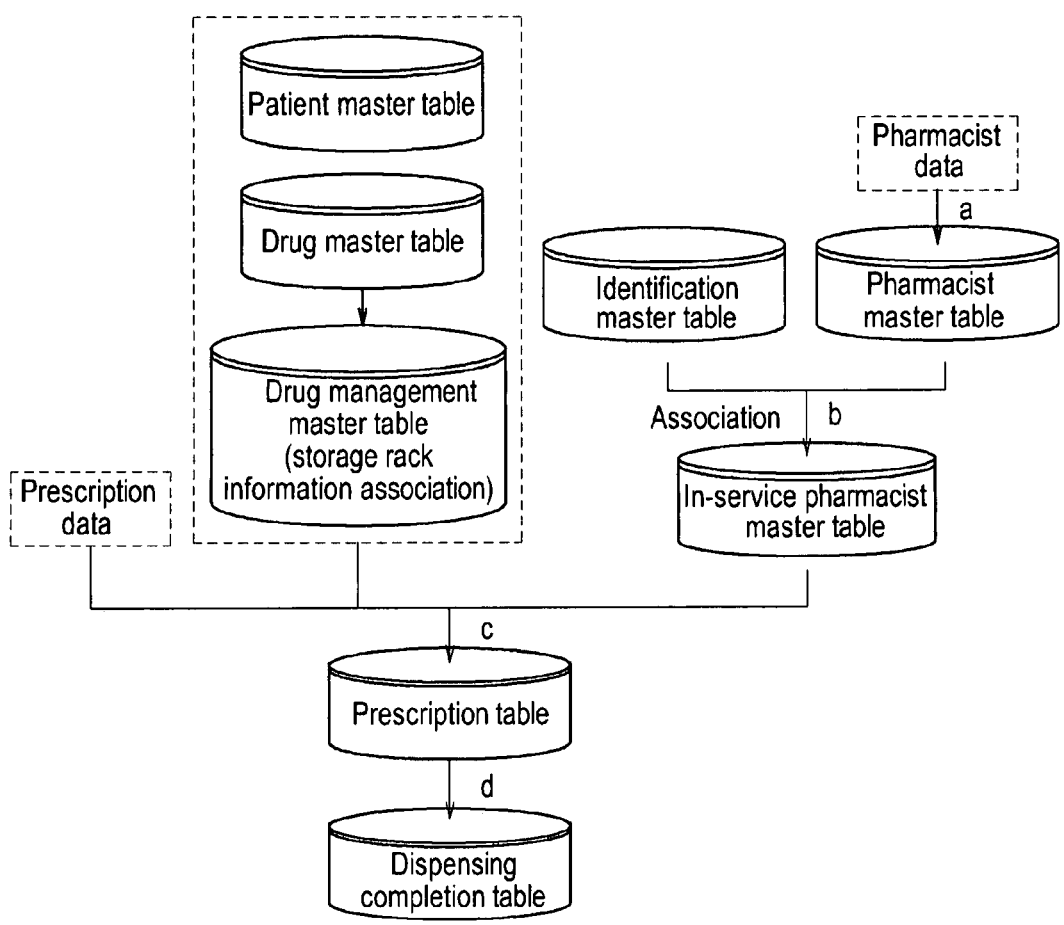
FIG. 16 is a data flow diagram.
Figure 18:
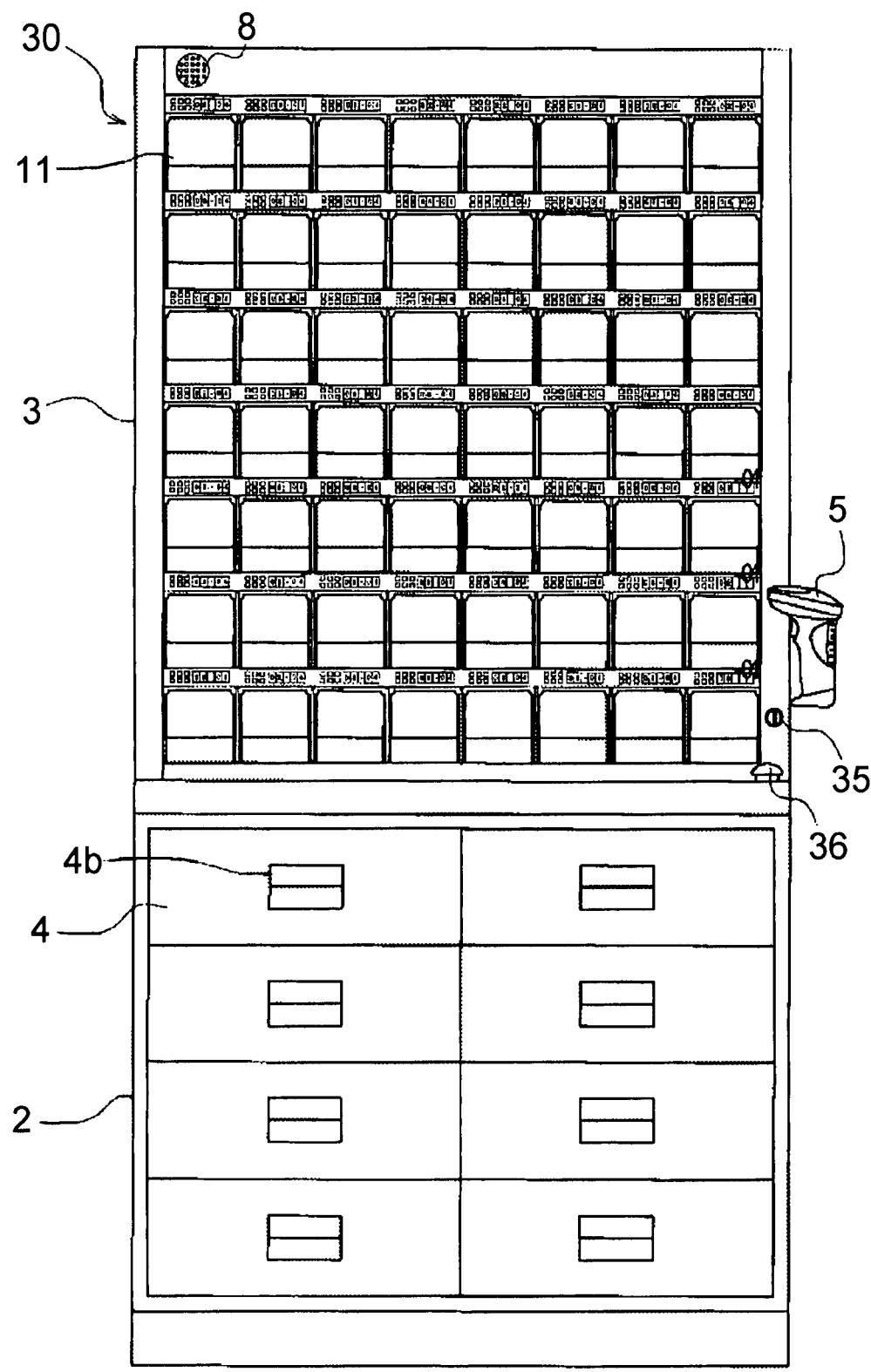
FIG. 18 is an elevation view of a dispensing support device according to a second embodiment.
Figure 19:
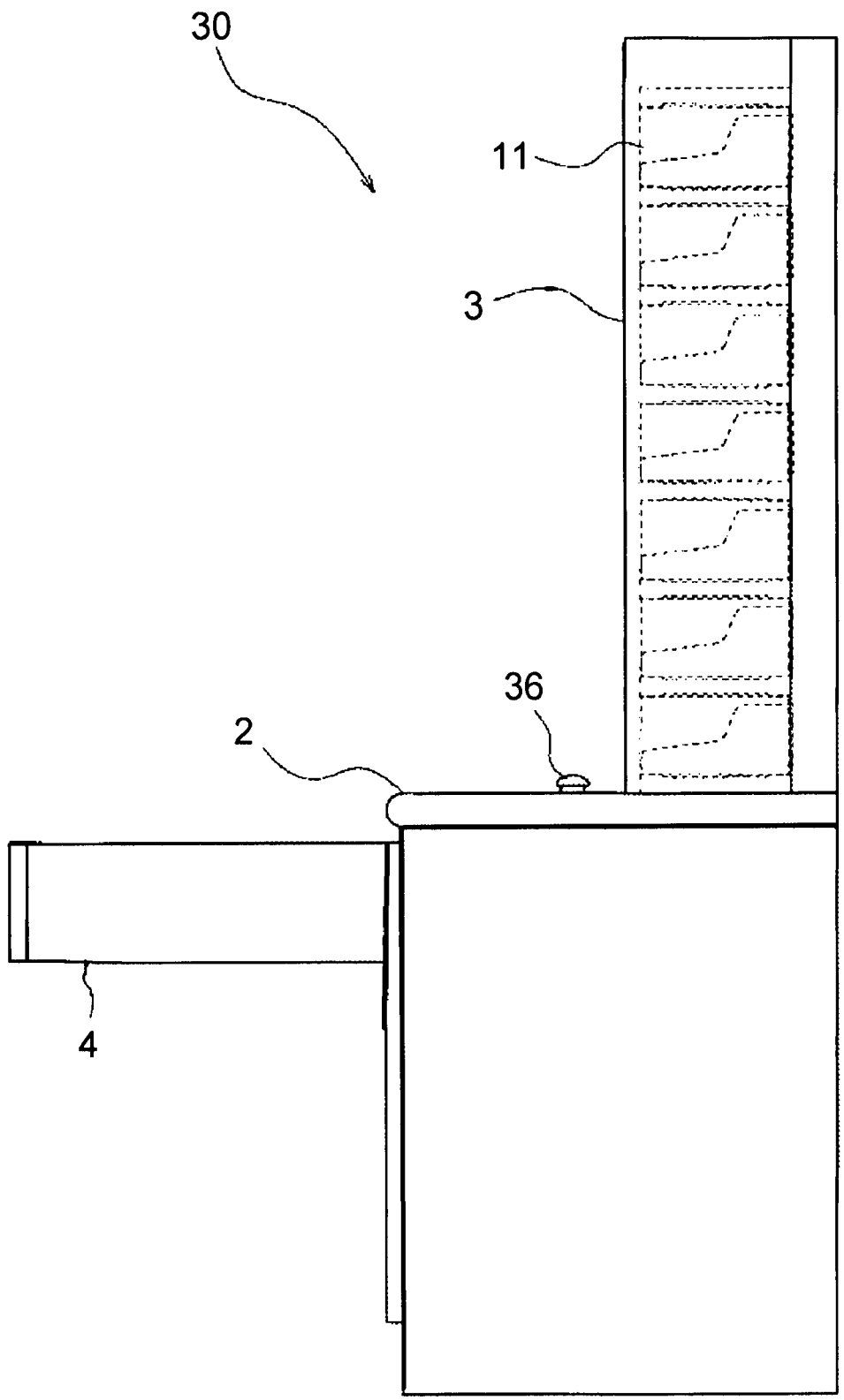
FIG. 19 is a side view of FIG. 1.
Figure 21:
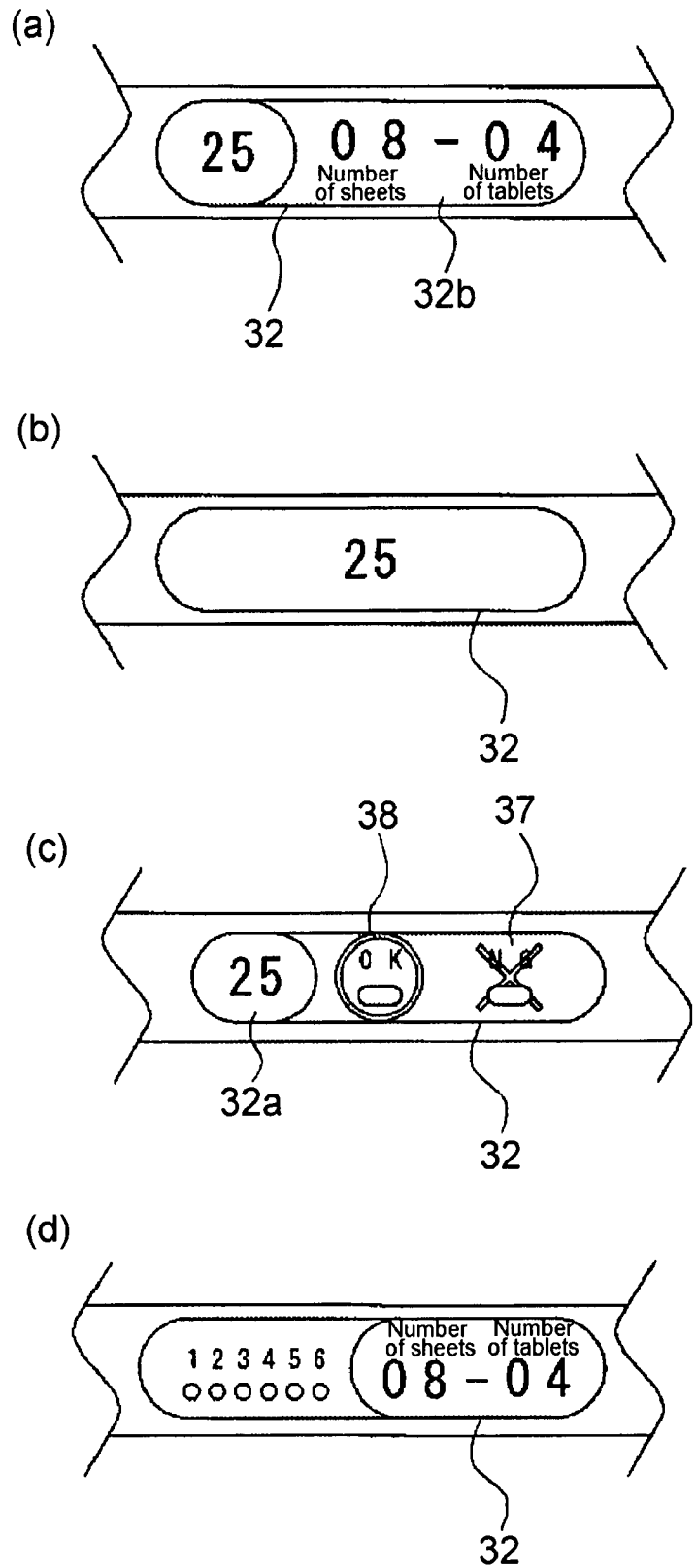
FIG. 21 is an elevation view showing an example of a first display part adoptable for the dispensing support device of FIG. 18.
Figure 23:
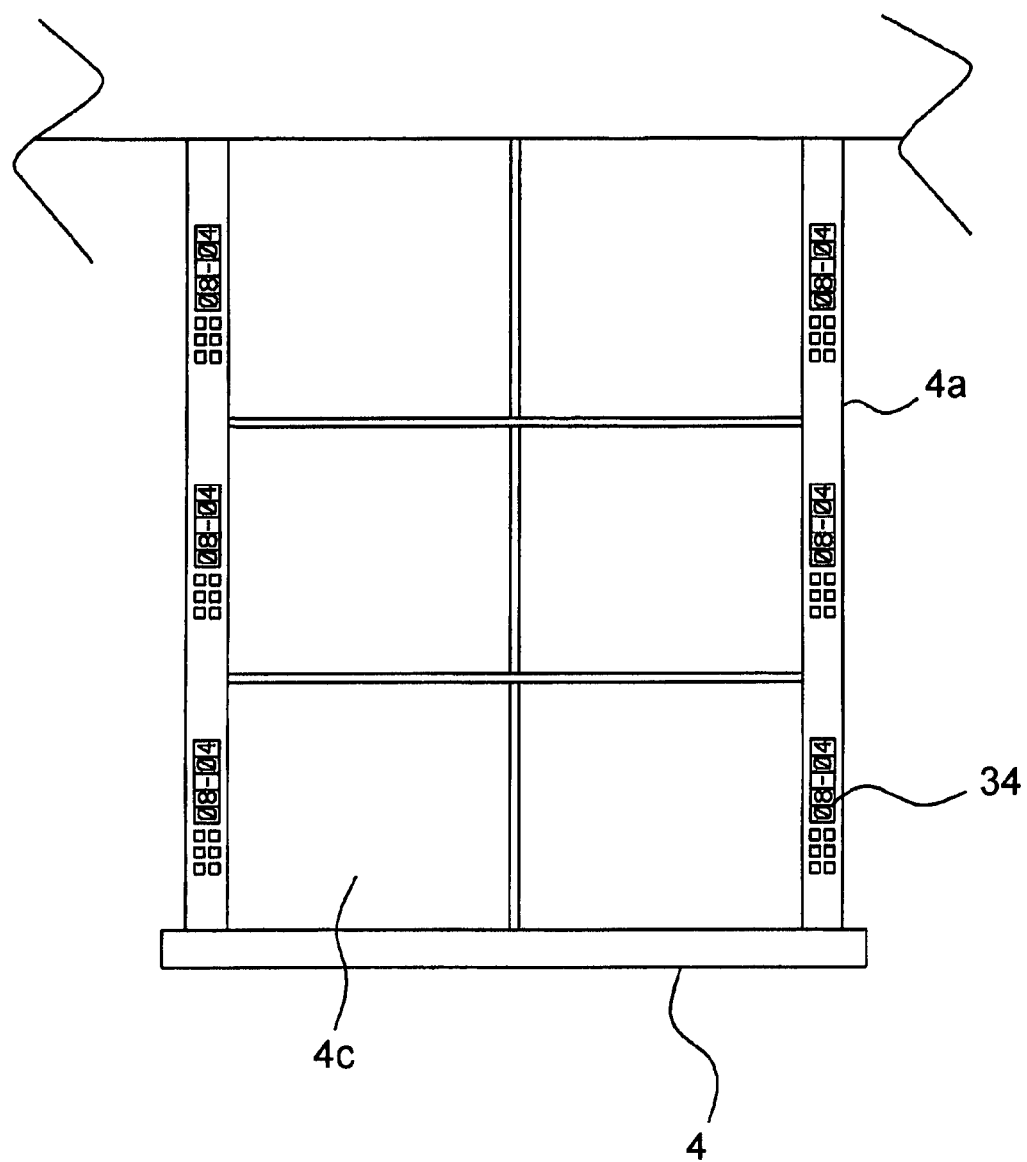
FIG. 23 is an elevation view showing an example of arrangement of a third display part adoptable for the dispensing support device of FIG. 18.
Figure 24:
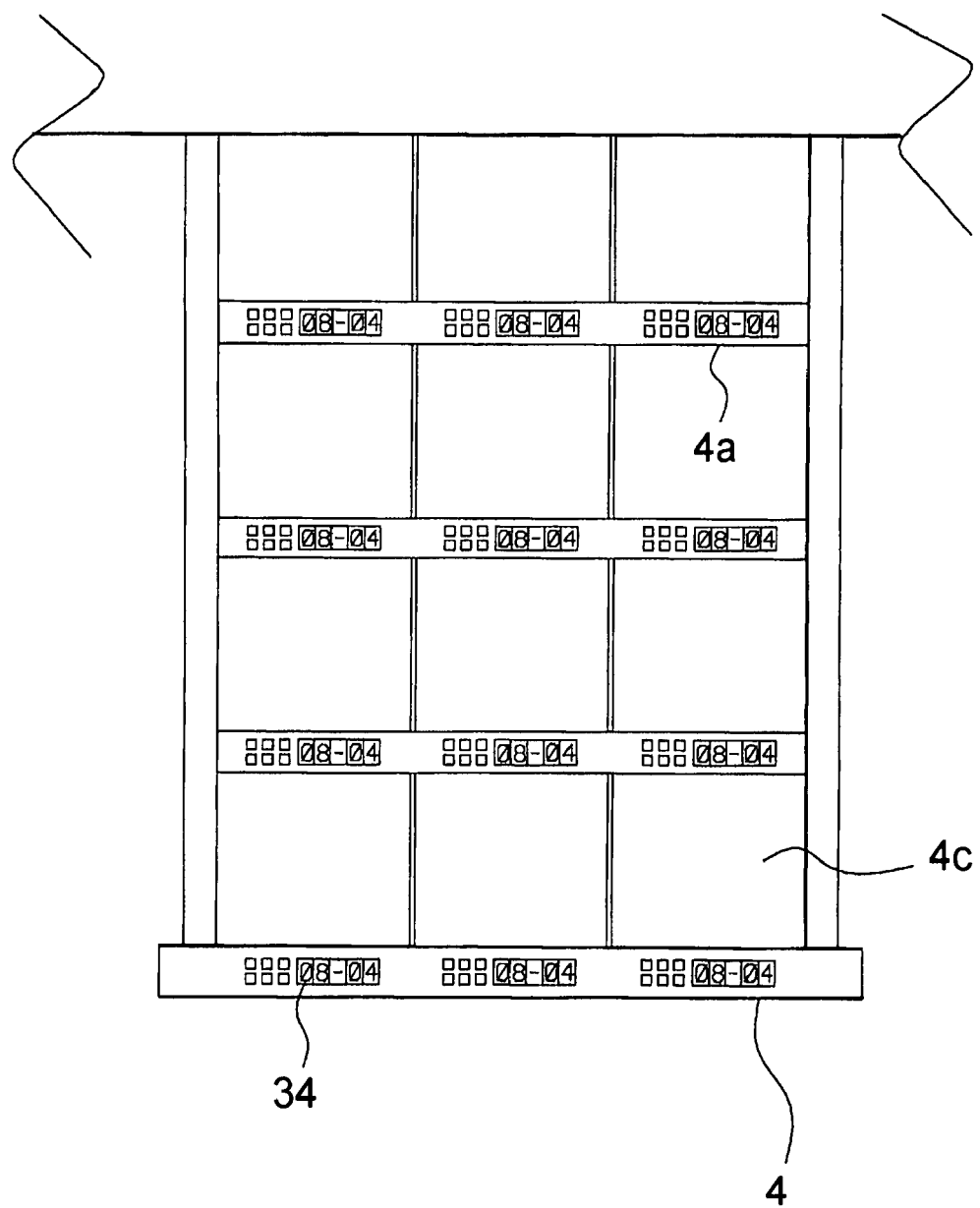
FIG. 24 is an elevation view showing another example of the arrangement of the third display part adoptable for the dispensing support device of FIG. 18.
Figure 25:
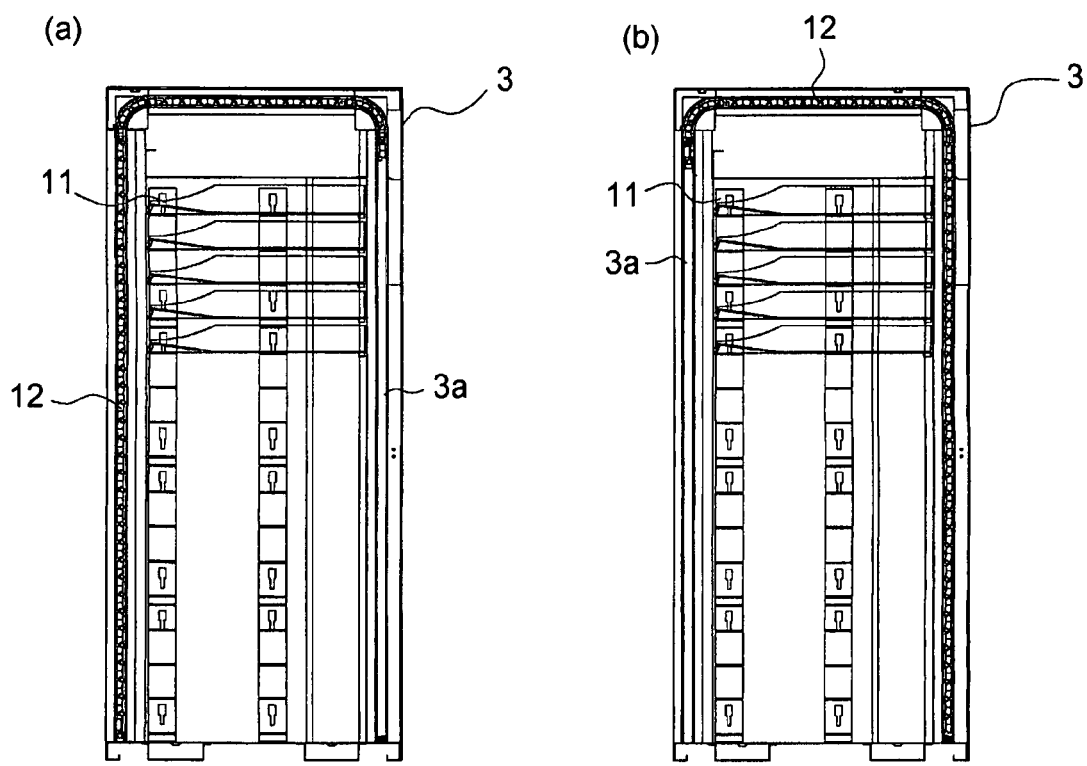
FIG. 25 is a side sectional view showing an example of a shutter adoptable for the dispensing support device of FIG. 18.

1. Dispensing support device
2. Dispensing base
3. Drug rack
4. Drawer
5. Bar code reader
6. Bar code identification part
7. RFID antenna (responsible pharmacist identification means)
8. Buzzer
9. Host computer
10. Identifying member
11. Cassette
12. Shutter
13. Display operation panel
14. Drug container (container)
15. Expected amount display part
16. Taken out amount display part
17. Identification display part
18. Cancel button
19. Antenna wire
20. Tilt base
21. Drug remaining amount detection sensor
22. Bias arm
23. Roller
24. Main controller (control means)
25. Memory part (memory means)
26. Display
31. Insertion detection sensor
32. First display part
33. Second display part
34. Third display part
35. Key hole
36. Dispensing completion button
37. NG display part
38. OK display part
39. Indication lamp
P. Dispensing direction note
A. Bar code
D. Drug
D1. Proper drug
D2. Fractional drug

The invention claimed is:

1. A dispensing support method comprising:
   providing a dispensing support system including:
   a plurality of containers for containment of a plurality of drugs, each one of the plurality of containers adapted to contain a corresponding one of the plurality of drugs, each of the plurality of containers including an insertion detector adapted to detect a responsible pharmacist that accesses the respective container, the responsible pharmacist being one identified from among a register of pharmacists,
   at least one computer-readable storage device for storage of pharmacist data and prescription data, the pharmacist data including the register of pharmacists, the prescription data specifying a designated container from the plurality of containers from which a corresponding drug is to be removed,
   a processor operatively coupled with the insertion detector and the at least one computer-readable storage device for identification of the responsible pharmacist, and
   an indicator adapted to indicate the responsible pharmacists;
   inputting the prescription data into the at least one computer readable storage device;
   creating a prescription table with the processor that associates prescription data and pharmacist data with each other as a result of inputting the prescription data;
   detecting and identifying the responsible pharmacist with the processor when one of the plurality of containers is accessed by the responsible pharmacist;
   referring to the prescription table with the processor to determine whether the responsible pharmacist is permitted to remove an accessed drug from the one of the plurality of containers; and
   indicating whether the responsible pharmacist detected as accessing the one of the plurality of containers is permitted to remove the accessed drug with the indicator,
   wherein the indicator provides different indications for different responsible pharmacists respectively.

2. The dispensing support method according to claim 1, wherein an identifying member for identifying the responsible pharmacist is fitted on a hand of the responsible pharmacist.

3. The dispensing support method according to claim 1, wherein each of the plurality of containers is provided with a drug remaining amount detection sensor for detection of an amount of drug remaining in the respective container.

4. The dispensing support method according to claim 3, wherein the processor calculates an amount of drug removed from each of the plurality of containers, and
   wherein the at least one computer-readable storage device stores the amount of drug removed in a dispensing completion table.

5. A dispensing support system, comprising:
   a plurality of containers for containment of a plurality of drugs, each one of the plurality of containers defining an opening adapted to contain a corresponding one of the plurality of drugs;
   means for storing pharmacist data and prescription data, the pharmacist data including a register of pharmacists, the prescription data specifying a designated container from the plurality of containers from which a corresponding drug is to be removed;
   wherein each of the plurality of containers includes:
      means for identifying a responsible pharmacist, the responsible pharmacist being one identified from among the register of pharmacists,
      an insertion detection sensor adapted to generate a detection signal when an object is present within the opening of the container, and
      means for generating an error indication when the detection signal is generated in the absence of detecting the responsible pharmacist; and
   means for determining whether the responsible pharmacist identified by the means for identifying the responsible pharmacist accessed the designated container or another of the plurality of containers.

6. The dispensing support system according to claim 5, wherein the means for identifying the responsible pharmacist includes an identifying member fitted on a hand of the responsible pharmacist.

7. The dispensing support system according to claim 5, further comprising:
   means for detecting an in-service pharmacist,
   means for determining whether the in-service pharmacist is registered in the pharmacist data;
   means for creating an in-service pharmacist table, and
   means for storing the in-service pharmacist table.

8. The dispensing support system according to claim 7, further comprising:
   an open and close member adapted to enable access to the plurality of containers,
   means for controlling the open and close member that is enabled when the in-service pharmacist is identified by the means for identifying the in-service pharmacist as being registered in the pharmacist data.

9. The dispensing support system according to claim 7, further comprising
   a plurality of doors, each adapted to enable access to a corresponding one of the plurality of containers;
   means for determining if the in-service pharmacist is the same as the responsible pharmacist; and
   means for enabling the in-service pharmacist to access the designated container.

10. The dispensing support system according to claim 5, wherein each of the plurality of containers includes a display part for identification of the responsible pharmacist that is permitted to dispense the drug from the corresponding container.

11. The dispensing support system according to claim 5, wherein each of the plurality of containers is provided with a drug remaining amount detection sensor for detection of an amount of drug remaining the respective container.

12. The dispensing support system according to claim 11, further comprising:
   means for calculating and storing an amount of drug removed from each of the plurality of containers, the amount of drug removed being stored in a dispensing completion table.

13. The dispensing support system according to claim 5, further comprising:
   means for determining an association between the prescription data and the responsible pharmacist for each drug removed by the responsible pharmacist from the plurality of containers; and
   means for storing the association.

14. The dispensing support system according to claim 5, wherein the designated container is a drawer having a closed position an inside that is divided into a plurality of additional containers, the drawer including:
  a first display part that is exposed when the drawer is in the closed position, the first display part indicating whether the drug to be dispensed is contained in the drawer; and
  a second display part that is exposed when the drawer is not in the closed position, the second display part indicating which of the additional containers contains the drug to be dispensed.

15. A dispensing support system, comprising:
  a plurality of containers for containment of a plurality of drugs, each one of the plurality of containers adapted to contain a corresponding one of the plurality of drugs, each of the plurality of containers defining an opening and including an insertion detector adapted to detect a responsible pharmacist that accesses the respective container, the responsible pharmacist being one identified from among a register of pharmacists,
  at least one computer-readable storage device for storage of pharmacist data and prescription data, the pharmacist data including the register of pharmacists, the prescription data specifying a designated container from the plurality of containers from which a corresponding drug is to be removed,
  a processor operatively coupled with the insertion detector and the at least one computer-readable storage device for identification of the responsible pharmacist, and
  a plurality of insertion detection sensors, each operatively coupled with a corresponding one of said plurality of containers and each adapted to generate a detection signal when an object is present within the opening of the container,
  wherein the at least one computer-readable storage device is configured to include instructions, the instructions comprising:
    receiving the prescription data;
    storing the prescription data into the at least one computer readable storage device;
    creating a prescription table with the processor that associates prescription data and pharmacist data with each other as a result of receiving the prescription data:
    detecting and identifying the responsible pharmacist with the processor when one of the plurality of containers is accessed by the responsible pharmacist;
    referring to the prescription table with the processor to whether the responsible pharmacist is permitted to remove an accessed drug from the one of the plurality of containers; and
    indicating whether the responsible pharmacist is permitted to remove the accessed drug, and
    generating an error indication when the detection signal is generated in the absence of detecting the responsible pharmacist.

16. The dispensing support system of claim 15 further comprising an identifying member adapted to fit on a hand of the responsible pharmacist.

17. The dispensing support system of claim 15 wherein the at least one computer-readable storage device is further configured to include instructions comprising:
  detecting an in-service pharmacist,
  determining whether the in-service pharmacist detected is registered in the pharmacist data;
  creating an in-service pharmacist table if the in-service pharmacist is registered in the pharmacist data, and
  storing the in-service pharmacist table into the at least one computer readable storage device.

18. The dispensing support system of claim 17 further comprising:
  an open and close member adapted to enable access to the plurality of containers, wherein the at least one computer-readable storage device is further configured to include instructions to open the open and close member when the in-service pharmacist is identified as being registered in the pharmacist data.

19. The dispensing support system of claim 17 further comprising:
  a plurality of doors, each adapted to enable access to a corresponding one of the plurality of containers; and
  the at least one computer-readable storage device is further configured to include instructions comprising:
    determining if the in-service pharmacist is the same as the responsible pharmacist; and
    enabling the in-service pharmacist to access the designated container when the in-service pharmacist is the same as the responsible pharmacist.

20. The dispensing support system of claim 15, wherein each of the plurality of containers includes a display part for identification of the responsible pharmacist that is permitted to dispense the drug from the corresponding container.

21. The dispensing support system of claim 15, wherein each of the plurality of containers is provided with a drug remaining amount detection sensor for detection of an amount of drug remaining the respective container.

22. The dispensing support system of claim 21 wherein the at least one computer-readable storage device is further configured to include instructions comprising calculating and storing an amount of drug removed from each of the plurality of containers, the amount of drug removed being stored in a dispensing completion table.

23. The dispensing support system of claim 15 wherein the at least one computer-readable storage device is further configured to include instructions comprising:
  determining an association between the prescription data and the responsible pharmacist for each drug removed by the responsible pharmacist from the plurality of containers; and
  storing the association in the at least one computer-readable storage device.

24. The dispensing support system according to claim 15, wherein the designated container is a drawer having a closed position an inside that is divided into a plurality of additional containers, the drawer including:
  a first display part that is exposed when the drawer is in the closed position, the first display part indicating whether the drug to be dispensed is contained in the drawer; and
  a second display part that is exposed when the drawer is not in the closed position, the second display part indicating which of the additional containers contains the drug to be dispensed.

* * * * *